(12) United States Patent
Ennis et al.

(10) Patent No.: US 7,020,796 B1
(45) Date of Patent: Mar. 28, 2006

(54) HIGH AVAILABILITY COMMUNICATION SYSTEM

(75) Inventors: Damon John Ennis, Los Gatos, CA (US); Mark Allen Dowdy, Los Altos, CA (US); Christopher Allen Cates, Cupertino, CA (US); Keith Erhart Rasmussen, Los Gatos, CA (US)

(73) Assignee: CIENA Corporation, Linthicum, MD (US)

( * ) Notice: Subject to any disclaimer, the term of this patent is extended or adjusted under 35 U.S.C. 154(b) by 732 days.

(21) Appl. No.: 10/004,180

(22) Filed: Oct. 29, 2001

Related U.S. Application Data

(60) Provisional application No. 60/308,475, filed on Jul. 27, 2001.

(51) Int. Cl.
*H02H 3/05* (2006.01)

(52) U.S. Cl. .......................................... 714/4
(58) Field of Classification Search .............. 714/4, 714/11; 709/200, 223, 225
See application file for complete search history.

(56) References Cited

U.S. PATENT DOCUMENTS 6,229,538 B1 * 5/2001 McIntyre et al. ........... 715/734
6,272,113 B1 * 8/2001 McIntyre et al. ........... 370/248
6,594,776 B1 * 7/2003 Karighattam et al. .......... 714/4

* cited by examiner

*Primary Examiner*—David Y. Eng
(74) *Attorney, Agent, or Firm*—Dougherty Clements; Christopher L. Bernard; Tyler S. Brown

(57) ABSTRACT

A high availability communication system is disclosed having multiple layers of redundancy, including network interface redundancy, network switching mechanism redundancy, and functional redundancy. To minimize the effect of the redundancy on other parts of an overall system, virtual addresses are implemented. These virtual addresses enable other parts of the overall system to interact with the communication system without knowing the details of the redundancy. By implementing multiple layers of redundancy with virtual addresses in this manner, high availability is achieved without causing inefficiencies to be suffered by other parts of the overall system.

61 Claims, 12 Drawing Sheets

Local Publishers Table

| Namespace | Reference to Publisher | IP address/ Port # |
|---|---|---|
| /LM/1/Monitor/Event/LOS | P1 | X1, Y1 |

Fig. 3A

Local Subscribers Table

| Namespace | Reference to Subscriber | IP address/ Port # | Reliability | Priority |
|---|---|---|---|---|
| /LM/2/Foo/Event/Sleep | S1 | X1, Y1 | Reliable | Normal |
| /LM/1/Monitor/Event/LOS | S2 | X2, Y2 | Best Effort | Normal |

Fig. 3B

Local Publishers Table 402

| Namespace | Reference to Publisher | IP address/ Port # |
|---|---|---|
| /LM/2/Foo/Event/Sleep (410) | P2 | X2, Y2 |

Fig. 4A

Local Subscribers Table 404

| Namespace | Reference to Subscriber | IP address/ Port # | Reliability | Priority |
|---|---|---|---|---|
| /*/Event/LOS (412) | S2 | X2, Y2 | Best Effort | Normal |
| /LM/2/Foo/Event/Sleep (414) | S1 | X1, Y1 | Reliable | Normal |

Fig. 4B

Local Servers Table

| Namespace | Reference to Server | IP address/Port # | Reliability | Priority |
|---|---|---|---|---|
| /LM/2/Foo/Op/Set | P2 | X2, Y2 | Best Effort | Normal |
| /LM/1/Monitor/Op/Get | P1 | X1, Y1 | Best Effort | Normal |

Fig. 4C

Local Clients Table

| Namespace | Reference to Client | IP address/Port # |
|---|---|---|
| /LM/1/Monitor/Op/Get | S2 | X2, Y2 |

Fig. 4D

Global Publishers Table — 502

| Namespace | Reference to Publisher | IP address/ Port # |
|---|---|---|
| /LM/1/Monitor/Event/LOS | P1 | X1, Y1 |
| /LM/2/Foo/Event/Sleep | P2 | X2, Y2 |
| /LM/3/Bar/Event/Wake | P3 | X3, Y3 |
| ... | ... | ... |

510 — /LM/1/Monitor/Event/LOS
512 — /LM/2/Foo/Event/Sleep
514 — /LM/3/Bar/Event/Wake

Fig. 5A

Global Subscribers Table — 504

| Namespace | Reference to Subscriber | IP address/ Port # | Reliability | Priority |
|---|---|---|---|---|
| /LM/2/Foo/Event/Sleep | S1 | X1, Y1 | Reliable | Normal |
| /*/Event/LOS | S2 | X2, Y2 | Best Effort | Normal |
| /LM/4/Test/Event/True | S3 | X4, Y4 | Best Effort | Normal |
| ... | ... | ... | ... | ... |

516 — /LM/2/Foo/Event/Sleep
518 — /*/Event/LOS
520 — /LM/4/Test/Event/True

Fig. 5B

Global Servers Table 506

| Namespace | Reference to Server | IP address/ Port # | Reliability | Priority |
|---|---|---|---|---|
| /LM/1/Monitor/Op/Get | P1 | X1, Y1 | Best Effort | Normal |
| /LM/2/Foo/Op/Set | P2 | X2, Y2 | Best Effort | Normal |
| ... | ... | ... | ... | ... |

520 — /LM/1/Monitor/Op/Get
522 — /LM/2/Foo/Op/Set

Fig. 5C

Global Clients Table 508

| Namespace | Reference to Client | IP address/ Port # |
|---|---|---|
| /LM/2/Foo/Op/Set | S1 | X1, Y1 |
| /LM/1/Monitor/Op/Get | S2 | X2, Y2 |
| ... | ... | ... |

524 — /LM/2/Foo/Op/Set
526 — /LM/1/Monitor/Op/Get

Fig. 5D

Reliable Communication Table 208(1)

| IP address/ Port # | Sending Sequence # | Receiving Sequence # | Missing Sequence Number List |
|---|---|---|---|
| X2, Y2 | 2040 | 50 | |
| ... | ... | ... | ... |

Reliable Communication Table 208(2)

| IP address/ Port # | Sending Sequence # | Receiving Sequence # | Missing Sequence Number List |
|---|---|---|---|
| X1, Y1 | 50 | 2040 | |
| ... | ... | ... | ... |

HIGH AVAILABILITY COMMUNICATION SYSTEM

CROSS-REFERENCE

This application claims the benefit of U.S. Provisional Application Ser. No. 60/308,475, entitled "High Availability Communication System", filed Jul. 27, 2001, the entire contents of which are incorporated herein by this reference.

FIELD OF THE INVENTION

This invention relates generally to communication systems, and more particularly to a high availability communication system capable of maintaining normal operation in the face of various types of errors/failures.

BACKGROUND

In the large-scale networks of today, switches are used on a regular basis to steer information from one location or site to another. In a typical switch, there are a plurality of line modules, control modules, timing modules, and switching modules. These various modules cooperate to carry out the switching and control functions of the switch. More specifically, the line modules carry information into and out of the switch, while the switching modules determine the interconnectivity between the line modules. By properly configuring the switching modules, any port of any line module may be coupled to any other port of any line module. Thus, the switching modules enable information to be switched or steered from any ingress line module port to any egress line module port.

The timing modules control the timing of the transfer of information from the ingress line module port to the egress line module port. Basically, the timing modules synchronize the ingress line module port and the egress line module port to ensure that information is transferred properly from one to the other. The control modules help to coordinate the interaction between the various other modules. While each module may implement its own control logic and may operate in many situations without the aid of the control modules, the control modules act as centralized mechanisms for coordinating the activities and communications between the various other modules.

In order to carry out all of the switching and control functions of the switch, the various modules need to communicate with each other. For example, the line modules may need to exchange information with one another to keep apprised of the overall state of the switch. Also, the line modules may need to communicate with the control modules to obtain coordination information therefrom. To enable the various modules to communicate with each other, a switch is typically provided with an underlying communication system. This communication system connects all of the modules together, and enables any module on the switch to communicate with any other module on the switch. Using this system, the various modules communicate with each other to carry out all of the necessary switching and control functions.

In many implementations, a switch is required to maintain high availability. High availability means that the switch maintains normal operation a high percentage of the time, even in the face of various errors/failures. In some implementations, the switch cannot have any more than a few minutes of downtime each year. To maintain such high availability, the switch has to be quite tolerant of errors and failures. As noted above, the various modules implement the switching and control functions of the switch using the underlying communication system. That being the case, in order to maintain high availability in the overall switch, the underlying communication system also has to be highly available. Unfortunately, the communication systems that are currently available fail to satisfactorily meet this criterion. For one thing, many systems fail to provide the fault tolerance necessary for maintaining high availability. In addition, in the systems that do provide some degree of fault tolerance, the fault tolerance is gained at the expense of increased inefficiency in other parts of the switch. These and other shortcomings exist in the currently available systems. Overall, the currently available systems fail to satisfactorily meet the high availability requirement demanded by many implementations. As a result, a need for an improved high availability communication system exists.

SUMMARY

In accordance with one embodiment of the present invention, there is provided a high availability communication system, which enables high availability to be achieved without causing inefficiencies to be suffered by other parts of an overall system. In one embodiment, high availability is achieved by providing multiple layers of redundancy. One layer of redundancy involves having multiple network interfaces on selected modules. With multiple interfaces, even if one interface fails, a module will still be able to maintain communication with an underlying network. Another layer of redundancy involves having multiple network switching mechanisms connected to various ones of the network interfaces. With multiple switching mechanisms, communications can be properly conveyed from one module to another even if one of the switching mechanisms fails. Yet another layer of redundancy involves functional redundancy. In one embodiment, certain functions (e.g. control and timing functions) are implemented by multiple modules, with one module being the primary performer of that function and another module being a secondary performer of the function. Should the primary performer fail, then the secondary performer takes over the primary performer's role and becomes the primary performer of that function. With these multiple layers of redundancies, it is possible for various errors/failures to occur without interrupting the normal operation of the communication system. Thus, high availability is achieved.

If not managed properly, redundancy may lead to greater complexity and inefficiency in other parts of an overall system. For example, redundancy may force another part of the overall system to determine which network interface to use to communicate with a module. Also, when a switchover, for example, from one network interface to another is performed, it may require large sets of information in another part of the overall system to be updated. In one embodiment, to minimize the effect of redundancy on other parts of the overall system, virtual addresses are implemented. Unlike a static address, which is statically mapped to a specific component or device, a virtual address is dynamically mapped to one of a plurality of components or devices. Since a virtual address can "float" among different devices, it is possible to use the same virtual address to access different devices. Thus, if these virtual addresses are used by other parts of the overall system, then the redundancy implemented by the communication system is hidden.

As a result, redundancy (and hence, high availability) is achieved without burdening other parts of the overall system.

BRIEF DESCRIPTION OF THE DRAWINGS

FIGS. 3A–3D illustrate some sample local tables for the line module 102(1) shown in FIG. 2.

FIGS. 4A–4D illustrate some sample local tables for the line module 102(2) shown in FIG. 2.

FIGS. 5A–5D illustrate some sample global tables for the control module 212(1) shown in FIG. 2.

FIG. 6 illustrates a sample reliable communication table for the line module 102(1) shown in FIG. 2.

FIG. 7 illustrates a sample reliable communication table for the line module 102(2) shown in FIG. 2.

DETAILED DESCRIPTION OF EMBODIMENT(S)

System Overview

Figure 1A:
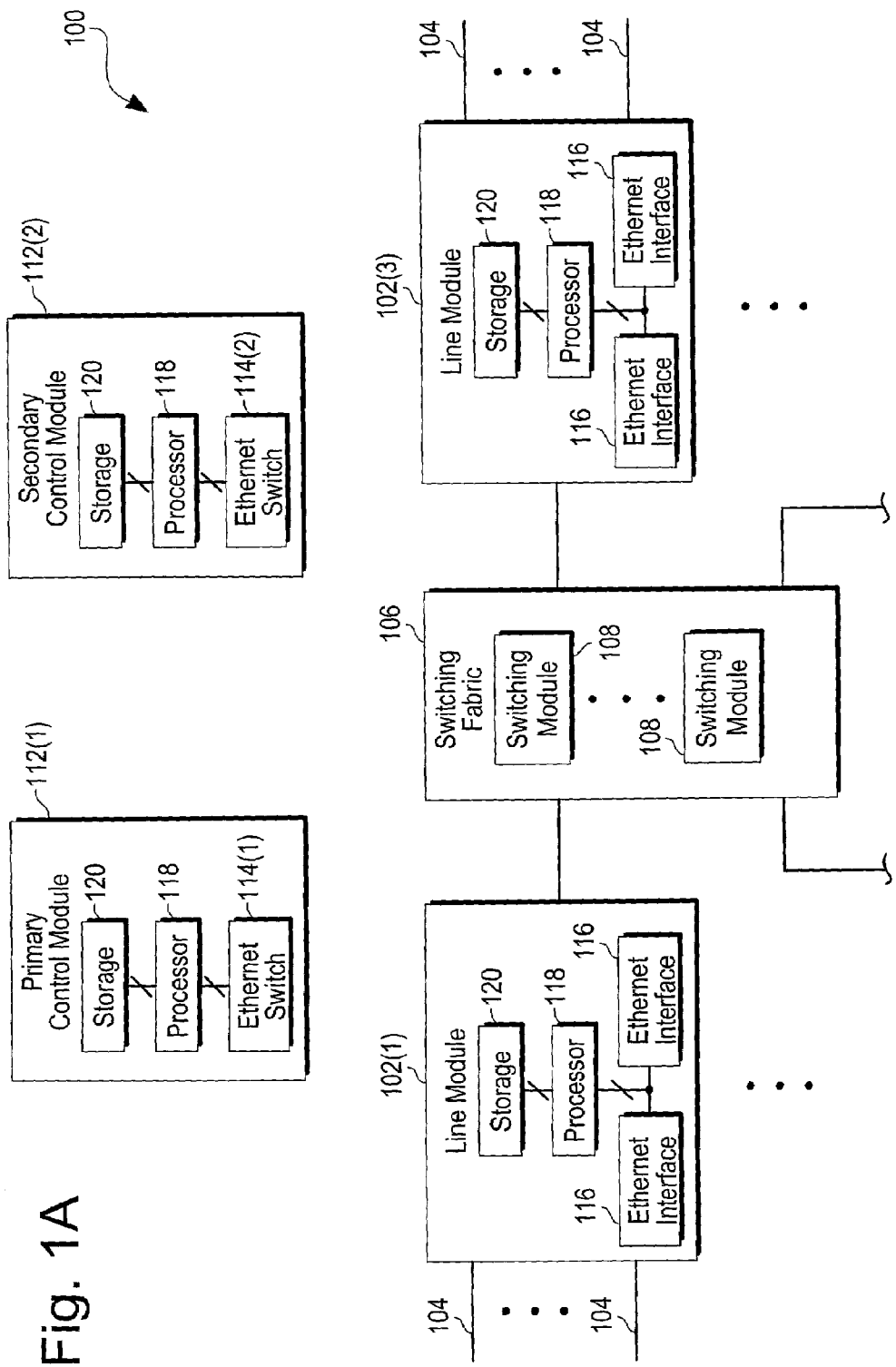
FIGS. 1A–1B provide an overview of a system in which one embodiment of the present invention may be implemented.
Figure 1B:
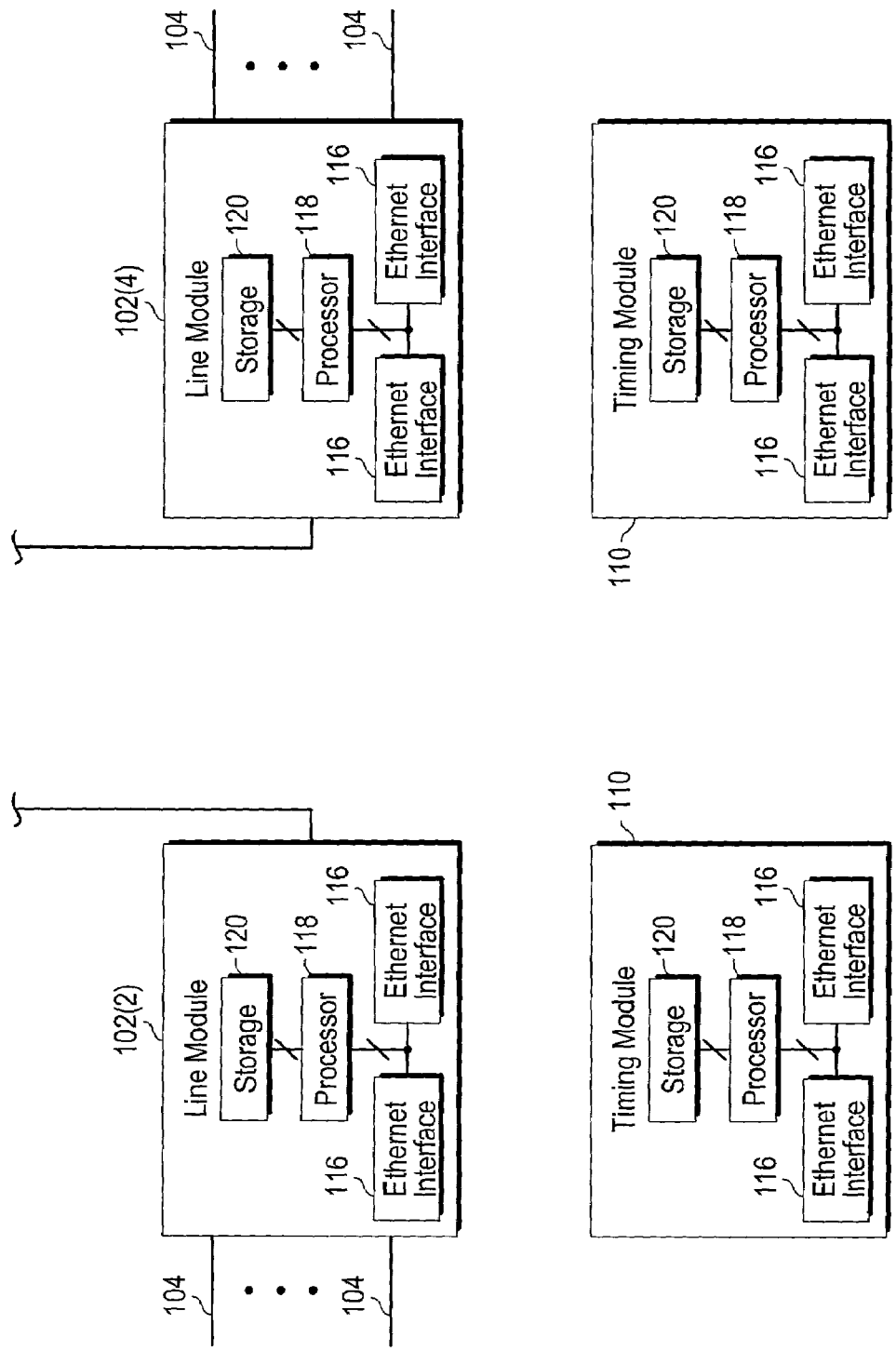

With reference to FIGS. 1A and 1B, there is shown an overview of a system 100 in which one embodiment of the present invention may be implemented. In the following discussion, it will be assumed for the sake of illustration that system 100 is a network switch for switching information from ingress ports to egress ports. It should be noted, however, that the present invention is not limited to being practiced within a switch, but rather may be implemented generally in any system in which inter-module distributed communication is desired.

As shown in FIGS. 1A and 1B, switch 100 comprises a plurality of line modules 102. In one embodiment, each line module 102 comprises a plurality of ports, with each port being coupled to a corresponding trunk 104. Each trunk 104, which may for example be an optical fiber, may carry information into a line module 102, out of a line module 102, or both. Each line module 102 is in turn coupled to a switching fabric 106, which comprises a plurality of switching components 108. When properly configured, the switching fabric 106 can couple any port of any line module 102 to any other port of any line module 102. Thus, by properly configuring the switching fabric 106, the switch 100 can transport information from any port of any line module 102 to any other port of any line module 102; hence, it follows that information can be switched from any trunk 104 to any other trunk 104. In this manner, information is transferred and directed through the switch 100.

The timing of information transfer through the switch 100 is controlled by the timing modules 110. More specifically, for each pair of line module ports that have been coupled together by the switching fabric 106, the timing modules 110 synchronize information transfer between the ports to ensure that information is transferred properly from one to the other.

In addition to the line modules 102, switching modules 106, and timing modules 110, the switch 100 further comprises a primary 112(1) and a secondary 112(2) control module. As will be explained in greater detail in a later section, the control modules 112 help to coordinate and facilitate interaction and communication between the various modules to enable all of the switching and control functions of the switch to be performed. In one embodiment, the primary control module 112(1) participates in regular system operation, while the secondary control module 112(2) acts as a backup. Should the primary control module 112(1) become disabled, then the secondary control module 112(2) will become the primary control module and will perform all of the functions of the primary control module.

To enable the various modules 102, 110, 112 to communicate with each other, switch 100 comprises an underlying communication network (not shown). In one embodiment, this communication network comprises an Ethernet backplane that interconnects all of the modules 102, 110, 112. In one embodiment, this network is separate and apart from the switching fabric 106 that couples the ports of the line modules 102 to each other. With the underlying communication network, any module 102, 110, 112 on the switch 100 can communicate with any other module on the switch 100. To enable the modules to access the communication network, there is provided on each line module 102 and each timing module 110 one or more Ethernet interfaces 116. Similarly, there is provided on each control module 112 an Ethernet switch 114. The Ethernet interfaces 116 are coupled to the Ethernet switches 114, and the Ethernet switches 114 are coupled to each other to provide each module 102, 110, 112 with connectivity and access to the communication network. In one embodiment, information is routed through the communication network using the Internet Protocol (IP). Thus, any module can send a message to any other module by specifying the IP address and port number associated with that other module.

As shown in FIGS. 1A and 1B, each line module 102, timing module 110, and control module 112 comprises a processor 118 and a storage 120. These components 118, 120 enable each module to implement its own set of logic and functionality. For example, each module may run its own set of one or more applications to implement any desired functionality. In addition, as will be described further in a later section, each module may execute one or more components of a communication facilitation mechanism (CFM) to facilitate inter-module communication. In one embodiment, the functionality of each module is derived by having the processor 118 on that module execute one or more sets of program instructions stored in the storage 120 of that module. In such an embodiment, the processor 118 (which may be a single processor or multiple processors) may be any mechanism capable of executing program instructions. The storage 120 may be any type of computer readable medium capable of storing information, including but not limited to memory, magnetic storage, and optical storage. The storage 120 may be used to store program instructions, data used by the processor 118 in executing the program instructions, data generated by the processor 118, as well as any other type of information.

In an alternative embodiment, the processor 118 may be replaced by specialized hardware logic components specially configured to implement some desired functionality. In such an embodiment, the functionality of each module would be derived not by having the processor 118 execute program instructions but rather from the customized logic of the hardware logic components. This and other embodiments are within the scope of the present invention.

Functional Overview

Figure 2:
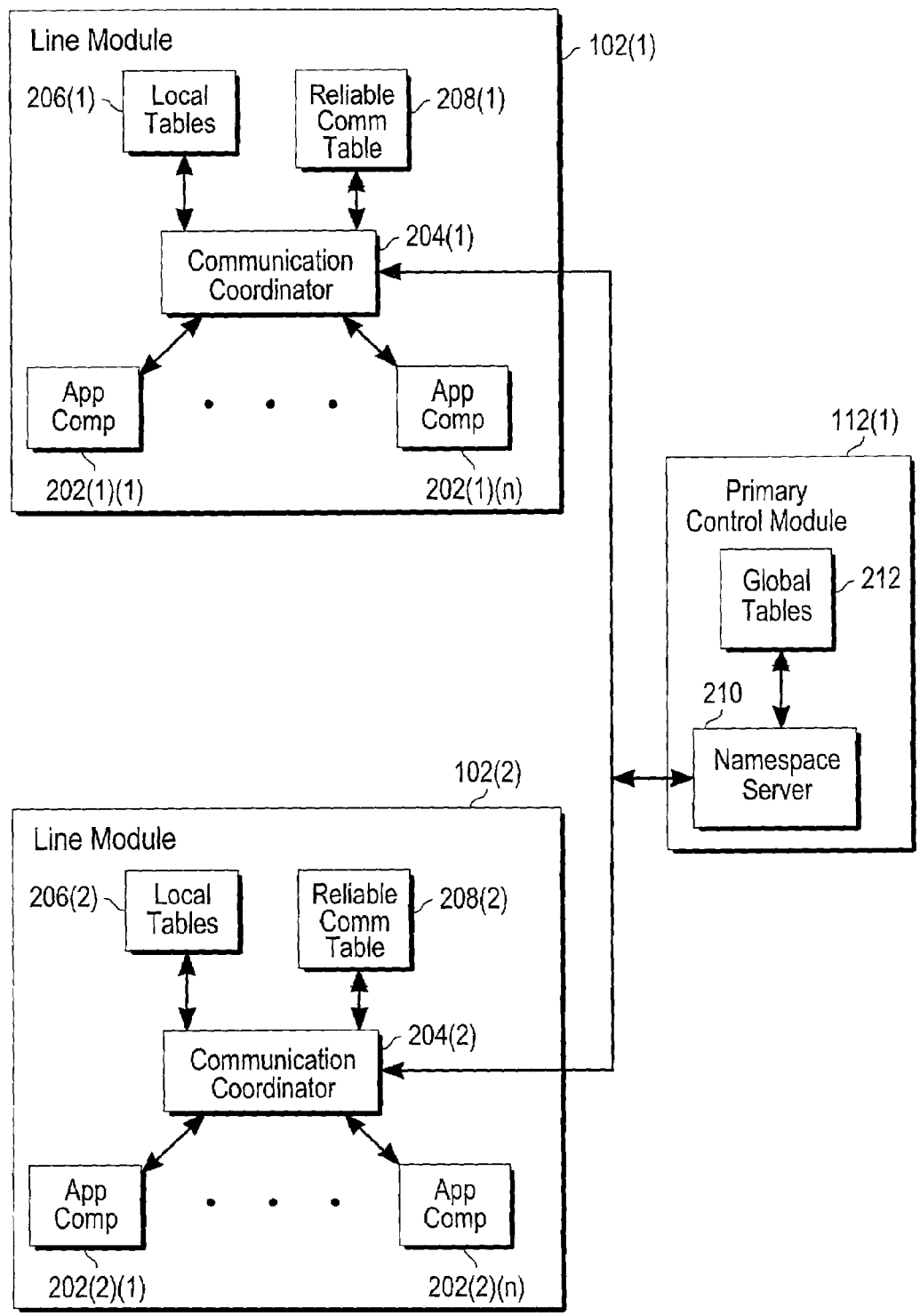
FIG. 2 is a functional block diagram of a portion of the system of FIG. 1, in which the components of a communication facilitation mechanism are shown, along with a plurality of application components that take advantage of the communication facilitation mechanism for inter-module communication.

FIGS. 1A and 1B provide an overview of the hardware components of the switch 100. With reference to FIG. 2, there is a shown an overview of the functional components of the switch 100. For the sake of simplicity, only two line modules 102(1), 102(2) and the primary control module 112(1) are shown in FIG. 2. However, it should be noted that the discussion provided for the modules in FIG. 2 also applies to the other modules in the switch 100.

As shown in FIG. 2, each line module 102(1), 102(2) comprises a plurality of application components 202. In one embodiment, these components 202 are derived from the processor 118 of each line module 102 executing one or more sets of application program instructions. For example, application components 202 may be objects that are instantiated during the execution of applications in an object-oriented environment. Each line module 102 may execute one or more applications; thus, the application components 202 on each line module 102 may be derived from the execution of a single application or from execution of a plurality of applications.

In addition to application components 202, each line module 102 further comprises a communication coordinator 204. In one embodiment, the communication coordinator 204 is derived on each line module 102 by having the processor 118 on that line module execute a set of communication coordinator instructions. As will be explained in greater detail in a later section, the communication coordinator 204 is a component of a communication facilitation mechanism (CFM), and one of its purposes is to facilitate and coordinate communication between the line module on which it resides and any other module in the switch 100. In carrying out its functions, the communication coordinator 204 uses at least two sets of information: (1) a set of local tables 206; and (2) a reliable communication table 208. In one embodiment, each of these sets of tables 206, 208 stores information relevant to a particular line module 102. For example, tables 206(1) and 208(1) store information relevant to line module 102(1), while tables 206(2) and 208(2) store information relevant to line module 102(2). Thus, each set of tables 206, 208 is directed to a particular line module 102. As will be described in greater detail in a later section, the information in these tables 206, 208 is used by each of the corresponding communication coordinators 204 to facilitate inter-module communication.

On the primary control module 112(1), there resides a namespace server 210. In one embodiment, the namespace server 210 is derived from the processor 118 on the control module 112(1) executing a set of namespace server instructions. Like the communication coordinators 204 on the line modules 102, the namespace server 210 is a component of the CFM, and like the communication coordinators 204, a function of the namespace server 210 is to coordinate inter-module communication. One difference between the communication coordinators 204 and the namespace server 210 is that while each of the communication coordinators 204 is concerned with coordinating communication to and from a particular line module 102, the namespace server 210 is concerned with coordinating communication throughout the entire switch 100. In carrying out its functions, the namespace server 210 uses information stored in the global tables 212. In one embodiment, the global tables 212 store a collection of all of the information in all of the local tables 206 of the line modules 102. Thus, the global tables 212 may be viewed as master tables for the switch 100. As will be explained further below, the namespace server 210 uses the information in the global tables 212 to help the communication coordinators 204 populate the local tables 206.

Together, all of the communication coordinators 204 and the namespace server 210 combine to form an overall CFM, which may be viewed as an intermediate communication layer or middleware. This CFM serves a number of different purposes. One of its main purposes is to shield the application components 202 from the complexity of the underlying communication network. With the CFM, the application components 202 are relieved of the burden of knowing the particulars of the network. For example, the application components 202 do not need to know the IP addresses of the various modules in the system, nor do they need to know the manner in which the network is configured. In addition, the CFM eliminates the need for the application components 202 to know where other application components 202 are located. To communicate with or to access another application component 202 on the same or a different line module 102, an application component 202 simply has to send a message to its corresponding communication coordinator 204. The communication coordinator 204 will then perform what is necessary to deliver the message to the other application component 202. By shielding the complexities of the network from the application components 202, the CFM greatly simplifies the logic that has to be implemented by the application components 202.

In addition to serving the shielding function, the CFM also provides rich functionality. This functionality includes but is not limited to the ability to implement a publish/subscribe system of communication, the ability to subscribe to multiple events with a single namespace specification and a single subscription request, the ability to broadcast messages, and the ability to implement reliable communication with an "at most once" message delivery guarantee, just to name a few. With this rich set of functionality, the application components 202 will be able to communicate with each other efficiently and conveniently across module boundaries.

Namespaces

In one embodiment, the application components 202 are shielded from the complexity of the underlying communication network through the use of global namespaces. More specifically, when an application component 202 wishes to communicate with another application component, the application component sends a message to its corresponding communication coordinator 204 specifying a particular namespace. In response, the corresponding communication coordinator 204, in possible cooperation with the namespace server 210, maps that namespace to one or more other application components 202. The corresponding communication coordinator 204 then delivers the message to the one or more communication coordinators 204 corresponding to the one or more other application components 202. Those communication coordinators 204 then in turn deliver the message to the one or more other application components 202. By using a global namespace, and by using the CFM as an intermediary in this manner, application components 202 can communicate with each other without knowing any of the particulars of the underlying communication network.

In one embodiment, a unique global namespace is assigned to each entity in each module of the switch 100.

The namespace may, in one embodiment, take on a hierarchical form, similar to that used in file systems. For example, for the application component 202(1)(1) on line module 102(1), the namespace may be "/LM/1/monitor", where the LM indicates that the component resides on a line module, the "1" indicates that it is on line module 1, and "monitor" is the name of the component. Similarly, the namespace for the application component 202(2)(1) may be "/LM/2/foo", where the LM indicates that the component resides on a line module, the "2" indicates that it is on line module 2, and "foo" is the name of the component. Using this or any other naming convention, each entity is assigned a unique namespace in the global namespace.

In addition to names of entities, the global namespace may also be used to designate operations and events associated with each of the entities. In one embodiment, these designations are made by adding more levels to the namespaces of the entities. More specifically, for operations, an "op" level is added to the namespaces. For events, an "event" level is added. For example, suppose application component 202(1)(1) has a "get" operation that it wishes to make available to other components to invoke (an operation may be viewed as a method of an object in an object oriented environment). In such a case, the namespace "/LM/1/monitor/op/get" may be assigned to the operation, where "/LM/1/monitor" identifies the component 202(1)(1), "op" indicates that an operation is being named, and "get" is the name of the operation. Similarly, if the same application component 202(1)(1) publishes an event named "LOS" (loss of signal), then the namespace "/LM/1/monitor/event/LOS" may be assigned to the event, where "/LM/1/monitor" identifies the component 202(1)(1), "event" indicates that an event is being named, and "LOS" is the name of the event. Using this naming convention, all of the entities, operations, and events in all of the modules of the switch 100 can be conveniently named in the global namespace.

After a namespace is assigned to an entity, operation, or event, that namespace may be used by various components for various purposes. For example, application components 202 may publish events to particular namespaces. Also, application components 202 may subscribe to particular namespaces to receive events that are published to those namespaces. In addition, application components 202 may invoke the operations provided by other application components 202 using namespaces. These and other uses of the namespaces are possible.

Namespace Registration

In one embodiment, before a namespace is generally used by application components 202, use of the namespace is first registered with the communication coordinators 204 and the namespace server 210 of the CFM. This registration process provides the components 204, 210 of the CFM with sufficient information about the namespace so that the CFM will be able to map the namespace to one or more application components 202 in the future for message delivery purposes. In one embodiment, the namespace registration process entails updating the local tables 206 of one or more line modules 102, as well as updating the global tables 212 of the control module 112(1). As noted previously, the local tables 206 comprise information relevant to a particular line module 102. In contrast, the global tables 212 comprise all of the information in all of the local tables 206 of all of the modules. Hence, the global tables 212 act as the master tables for the entire switch 100.

Figure 3C:
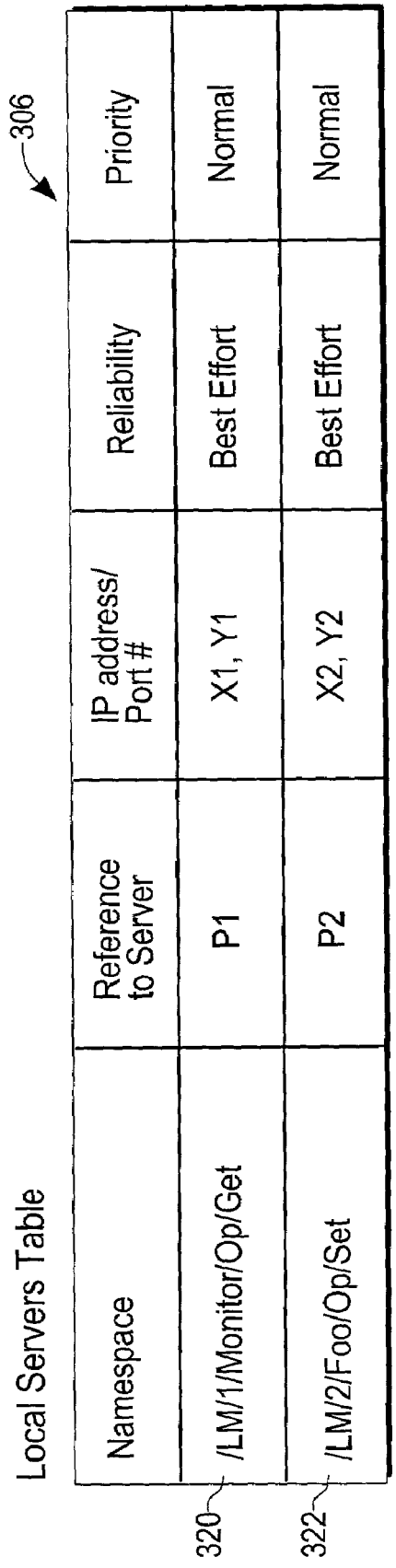
Figure 3D:
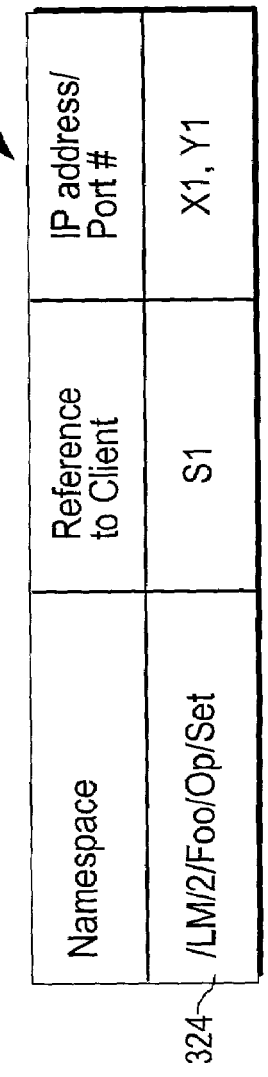

To illustrate the registration process, reference will be made to the specific examples shown in FIGS. 3, 4, and 5. Specifically, FIGS. 3A–3D show the tables that comprise the local tables 206(1) of line module 102(1), FIGS. 4A–4D show the tables that comprise the local tables 206(2) of line module 102(2), and FIGS. 5A–5D show the tables that comprise the global tables 212 of the control module 112(1). In one embodiment, the CFM supports both publish/subscribe communication and client/server operation. Thus, as shown in FIGS. 3, 4 and 5, the local tables 206 and the global tables 212 comprise a plurality of separate tables, including a Publishers table 302, 402, 502, a Subscribers table 304, 404, 504, a Servers table 306, 406, 506, and a Clients table 308, 408, 508. These various tables are used by the CFM to support the different communication/operation models.

In one embodiment, a namespace may be used by an application component 202 in at least four different ways. An application component 202 may: (1) publish an event to a namespace; (2) subscribe to a namespace to receive all events published to that namespace; (3) expose an operation provided by an application component 202 through a namespace (and hence act as a server for that operation); and (4) invoke an operation provided by another application component 202 through a namespace (and hence act as a client for that operation). In one embodiment, each of these uses of a namespace by an application component 202 is registered with the CFM. In the following discussion, the manner in which each of these uses is registered will be described.

Publication/Subscription Registration

To illustrate the publication registration process, suppose that application component 202(1)(1) of FIG. 2 wishes to publish an event to the namespace "/LM/1/monitor/event/LOS". To register this use of the namespace, the application component 202(1)(1) sends a publication announcement message to the communication coordinator 204(1). In this message, the application component 202(1)(1) provides: (1) an indication that it is registering to publish an event to the namespace "/LM/1/monitor/event/LOS"; and (2) a reference (P1) back to itself. This reference (which may for example be a pointer) will be used by the communication coordinator 204(1) to communicate with the application component 202(1)(1) if the need arises. In response to the publication announcement message, the communication coordinator 204(1) updates the Local Publishers Table 302 (FIG. 3A) for line module 102(1) by creating a new entry 310 in the table 302. In the new entry 310, the namespace "/LM/1/monitor/event/LOS" is stored in the Namespace column, and the reference (P1) back to the publishing component 202(1)(1) is stored in the "Reference to Publisher" column. In addition, an IP address and port number are stored in the IP Address/Port# column. This is the IP address and port number of the line module 102(1) on which the publishing component 202(1)(1) resides. Assuming the IP address and port number of line module 102(1) are X1 and Y1, respectively, the value pair of X1, Y1 will be stored in the new entry 310. The Local Publishers Table 302 is thus updated.

Thereafter, the communicator coordinator 204(1) proceeds to send a publication announcement message to the control module 112(1) to inform the namespace server 210 of the intended publication to the namespace. In this message, the communication coordinator 204(1) provides: (1) the namespace ("LM/l/monitor/event/LOS") to which publication will be made; (2) the reference P1 back to the publishing component 202(1)(1); and (3) the IP address and port number of the line module 102(1). In response, the namespace server 210 creates a new entry 510 in the Global Publishers Table 502 (FIG. 5A), and stores the above-provided information into the corresponding columns of the entry 510. The Global Publishers Table 502 is thus updated.

Thereafter, the namespace server 210 checks the Global Subscribers Table 504 (FIG. 5B) to determine whether there are any subscribers to the newly registered namespace "LM/1/monitor/event/LOS". If there are subscribers to the namespace, then the namespace server 210 extracts information relating to each of the subscribers from the Global Subscribers Table 504 and sends that information back to the communication coordinator 204(1) associated with the publishing component 202(1)(1). For the time being, however, it will be assumed that entry 518 of the Global Subscribers Table 504 does not yet exist and that there are no current subscribers to the namespace "/LM/1/monitor/event/LOS". Hence, the namespace server 210 sends an empty subscriber list back to the communication coordinator 204(1). The publication registration process is thus completed.

To illustrate the subscription registration process, suppose that application component 202(1)(n) of FIG. 2 wishes to subscribe to the namespace "μM/2/foo/event/sleep" to receive events published to that namespace. To register this use of the namespace, the application component 202(1)(n) sends a subscription announcement message to the communication coordinator 204(1). In this message, the application component 202(1)(n) provides: (1) an indication that it is registering to subscribe to the namespace "/LM/2/foo/event/sleep"; (2) a reference (S1) back to itself; (3) an indication of what type of reliability is desired; and (4) an indication of a desired priority. In one embodiment, the reliability may be "best effort" or "reliable". If best effort is specified, no acknowledgment of messages is required. If reliable is specified, messages need to be acknowledged. Reliability will be discussed in greater detail in a later section. As to priority, the application components 202(1)(n) may specify normal or high priority. Reliability and priority determine how event messages will be delivered to the subscribing component 202(1)(n) when events are published.

In response to the subscription announcement message, the communication coordinator 204(1) updates the Local Subscribers Table 304 (FIG. 3B) for line module 102(1) by creating a new entry 312. In the new entry 312, the namespace "/LM/2/foo/event/sleep" is stored in the Namespace column, and the reference (S1) back to the subscribing component 202(1)(n) is stored in the "Reference to Subscriber" column. In addition, the IP address and port number (X1, Y1) of the line module 102(1) on which the subscribing component 202(1)(n) resides are stored in the IP Address/Port# column, the reliability indication is stored in the Reliability column, and the priority indication is stored in the Priority column. The Local Subscribers Table 304 is thus updated to reflect the subscription registration.

Thereafter, the communicator coordinator 204(1) sends a subscription announcement message to the control module 112(1) to inform the namespace server 210 of the subscription to the namespace. In this message, the communication coordinator 204(1) provides: (1) the namespace ("LM/2/foo/event/sleep") to which subscription is being made; (2) the reference S1 back to the subscribing component 202(1)(n); (3) the IP address and port number (X1, Y1) of the line module 102(1); (4) the reliability indication; and (5) the priority indication. In response to this message, the namespace server 210 creates a new entry 516 in the Global Subscribers Table 504 (FIG. 5B), and stores the above-provided information into the corresponding columns of the entry 516. The Global Subscribers Table 504 is thus updated to include the new subscription.

Thereafter, the namespace server 210 checks the Global Publishers Table 502 (FIG. 5A) to determine whether there are any publishers that have registered to publish events to the namespace "/LM/2/foo/event/sleep". If there are, then the namespace server 210 informs the communication coordinator 204 associated each of those publishers of the new subscription. For the time being, however, it will be assumed that entry 512 of the Global Publishers Table 502 does not yet exist and that there are no current publishers to the namespace "/LM/2/foo/event/sleep". Hence, the namespace server 210 does not notify any publishers of the new subscription. The subscription registration process is thus completed.

Suppose now that application component 202(2)(n) of FIG. 2 wishes to subscribe to a namespace. However, instead of subscribing to a unique namespace, it wishes to subscribe to potentially a plurality of namespaces. For example, instead of subscribing to a specific LOS namespace such as /LM/1/monitor/event/LOS, which is specific to the application component named "monitor" on line module 1, the component 202(2)(n) may wish to subscribe to all LOS event namespaces regardless of the application component or line module. Using a wildcard character *, this wish may be expressed as /*/event/LOS. In currently available alternatives to the CFM, it is not possible to subscribe to a plurality of events using a single name expression. Rather, a subscriber is required to subscribe to each individual event name separately. For systems with large numbers of events, this approach can quickly become inefficient and non-scalable.

In contrast, in one embodiment of the present invention, there is provided a capability within the CFM to subscribe to multiple namespaces using a single namespace expression and a single subscription registration request. In such an embodiment, the namespace expression may contain wildcard characters, such as *. When processing registration requests involving namespace expressions, the namespace server 210 performs pattern matching to resolve the namespace expressions to determine which specific namespaces match the expressions. Then, the namespace server 210 automatically subscribes to the specific matching namespaces. By processing namespace expressions in this manner, the namespace server 210 makes it possible to subscribe to multiple namespaces using a single relatively simple namespace expression. This in turn can lead to significant efficiency and scalability gains.

Thus far, only the general wildcard * has been discussed as being usable in a namespace expression. It should be noted that the pattern matching capability of the namespace server 210 is not so limited. Rather, the namespace server 210 may perform any type of logical pattern matching. For example, it can find matches for patterns beginning with a particular letter or letters (e.g. M*, or Ma*). It can also resolve expressions having more than one wildcard. For example, the namespace expression /LM/*/*/event/LOS would find all LOS events from all line modules and all application components on those line modules. In addition, it can find matches for wildcards of specific length. For example, for the expression "?mall", the namespace server 210 would find all matches that begin with any one character and ends with "mall". Basically, the namespace server 210 is capable of performing any known type of pattern matching. With this powerful capability, the namespace server 210 greatly facilitates the subscription registration process.

To illustrate how the namespace server 210 implements this capability, reference will now be made to an example. Suppose that application component 202(2)(n) on line module 102(2) wishes to subscribe to the namespace expression "/*/event/LOS" to receive all LOS events published by all application components 202 on all modules. To register use of this namespace expression, the application component 202(2)(n) sends a subscription announcement message to the communication coordinator 204(2). In this message, the application component 202(2)(n) provides: (1) an indication that it is registering to subscribe to the namespace expression "/*/event/LOS"; (2) a reference (S2) back to itself; (3) an indication of what type of reliability is desired; and (4) an indication of a desired priority. In response to the subscription announcement message, the communication coordinator 204(2) updates the Local Subscribers Table 404 (FIG. 4B) for line module 102(2) by creating a new entry 412. In the new entry 412, the namespace expression "/*/event/LOS" is stored in the Namespace column, and the reference (S2) back to the subscribing component 202(2)(n) is stored in the "Reference to Subscriber" column. In addition, the IP address and port number (X2, Y2) of the line module 102(2) on which the subscribing component 202(2)(n) resides are stored in the IP Address/Port# column, the reliability indication is stored in the Reliability column, and the priority indication is stored in the Priority column. The Local Subscribers Table 404 is thus updated to reflect the subscription registration.

Thereafter, the communicator coordinator 204(2) sends a subscription announcement message to the control module 112(1) to inform the namespace server 210 of the subscription to the namespace expression. In this message, the communication coordinator 204(2) provides: (1) the namespace expression "/*/event/LOS"; (2) the reference S2 back to the subscribing component 202(2)(n); (3) the IP address and port number (X2, Y2) of the line module 102(2); (4) the reliability indication; and (5) the priority indication. In response to this message, the namespace server 210 creates a new entry 518 in the Global Subscribers Table 504 (FIG. 5B), and stores the above-provided information into the corresponding columns of the entry 518. The Global Subscribers Table 504 is thus updated to include the new subscription.

Thereafter, the namespace server 210 checks the Global Publishers Table 502 (FIG. 5A) to determine whether there are any publishers that have registered to publish events to namespaces that match the namespace expression "/*/event/LOS". In making this determination, the namespace server 210 in one embodiment performs pattern matching on each of the namespaces in the Global Publishers Table 502 to find all matches for the namespace expression "/*/event/LOS. For each matching namespace, the namespace server 210 informs a corresponding communication coordinator 204 of the new subscription. In the present example, a single matching entry is found, namely the namespace "/LM/1/monitor/event/LOS" found in entry 510. Thus, the namespace server 210 communicates with the communication coordinator 204(1) corresponding to the publishing component 202(1)(1) of that namespace to inform that communication coordinator 204(1) of the new subscription.

To do so, the namespace server 210 in one embodiment, first creates a subscriber message packet. The namespace server 210 stores within this message packet all of the information pertaining to the new subscription. Specifically, in one embodiment, the message includes: (1) the specific namespace "/LM/1/monitor/event/LOS" that matched the namespace expression; (2) the reference S2 back to the subscribing component 202(2)(n); (3) the IP address and port number of the line module 102(2) on which the subscribing component 202(2)(n) resides; (4) the reliability indication; and (5) the priority indication. Once created, the packet is addressed to the IP address and port number X1, Y1 (derived from entry 510 of the Global Publishers Table 502 (FIG. 5A)) of the line module 102(1) on which the publishing component 202(1)(1) resides (recall from previous discussion that component 202(1)(1) has registered to publish to the namespace "/LM/1/monitor/event/LOS"). Thereafter, the namespace server 210 sends the message packet to the underlying communication network. Based upon the IP address and port number, the packet is routed to the communication coordinator 204(1) of the line module 102(1) on which the publishing component 202(1)(1) resides.

In response to the subscriber message packet, the communication coordinator 204(1) updates its Local Subscribers Table 304 (FIG. 3B) to include the subscriber information contained in the packet. In this example, the communication coordinator 204(1) creates a new entry 314, and populates the new entry 314 with the subscriber information contained in the packet. Note that entry 314 contains generally the same information as entry 518 of the Global Subscribers Table 504 (FIG. 5), except that rather than having a namespace expression in the namespace column, entry 314 has a specific namespace in that column. Once the new entry 314 is created and populated, the subscription registration process is completed. In this manner, in response to a subscription registration request made by a subscribing component 202(2)(n) on one line module 102(2), subscriber information is sent from the namespace server 210 to the communication coordinator 204(1) on another line module 102(1). In this way, the namespace server 210 maintains publisher/subscriber information throughout the entire switch 100.

In the above example, for the sake of simplicity, only one matching namespace was shown in the Global Publishers Table 502. In many implementations, however, multiple matching namespaces may be found for the same namespace expression. In such cases, the namespace server 210 would, for each matching namespace, communicate with the communication coordinator 204 corresponding to the publisher of that namespace, and inform that communication coordinator 204 of the new subscription. In one embodiment, the namespace server 210 would communicate with each such communication coordinator 204 by sending a subscriber message packet in the manner described above.

To complete discussion of the registration process, suppose now that the application component 202(2)(1) of line module 102(2) wishes to publish an event to the namespace "/LM/2/foo/event/sleep". To register this use of the namespace, the application component 202(2)(1) sends a publication announcement message to the communication coordinator 204(2). In this message, the application component 202(2)(1) provides: (1) an indication that it is registering to publish an event to the namespace "/LM/2/foo/event/sleep"; and (2) a pointer (P2) back to itself. In response to the publication announcement message, the communication coordinator 204(2) updates the Local Publishers Table 402 (FIG. 4A) for line module 102(2) by creating a new entry 410. In the new entry 410, the namespace "/LM/2/foo/event/sleep" is stored in the Namespace column, and the reference (P2) back to the application component 202(2)(1) is stored in the "Reference to Publisher" column. In addition, the IP address and port number (X2, Y2) of the line module 102(2) on which the publishing component 202(2)(1) resides is stored in the IP address/Port# column. The Local Publishers Table 402 is thus updated.

Thereafter, the communicator coordinator 204(2) proceeds to send a publication announcement message to the control module 112(1) to inform the namespace server 210 of the intended publication to the namespace. In this message, the communication coordinator 204(2) provides: (1) the namespace ("LM/2/foo/event/sleep") to which publication will be made; (2) the reference P2 to the publishing component 202(2)(1); and (3) the IP address and port number of the line module 102(2). In response, the namespace server 210 creates a new entry 512 in the Global Publishers Table 502 (FIG. 5A), and stores the above-provided information into the corresponding columns of the entry 512. The Global Publishers Table 502 is thus updated.

Thereafter, the namespace server 210 checks the Global Subscribers Table 504 (FIG. 5B) to determine whether there are any subscribers to the newly registered namespace "/LM/2/foo/event/sleep". In making this determination, the namespace server 210 scans through the table 504, and checks for exact matches of the namespace, as well as pattern matches. Like entry 518, some of the entries in table 504 may contain namespace expressions rather than specific namespaces. For such namespace expressions, the namespace server 210 resolves the expression to determine whether there is a pattern match between the expression and the newly registered namespace. In the present example, a namespace match is found, namely, the namespace stored in entry 516. Since a match is found, thereby meaning that there is a subscriber to the newly registered namespace, the namespace server 210 extracts the information pertaining to the subscriber from the Global Subscribers Table 504 and sends that information to the communication coordinator 204(2) associated with the publishing component 202(2)(1). In this example, there is only one subscriber to the namespace. In cases where there are multiple subscribers, the information pertaining to all of the subscribers will be extracted from the Global Subscribers Table 504 and sent to the communication coordinator 204(2).

To send the subscriber information to the communication coordinator 204(2), the namespace server 210, in one embodiment, creates a subscriber message packet. The namespace server 210 stores within this message packet all of the information extracted from the Global Subscribers Table 504 pertaining to all of the subscribers of the namespace. The packet is then addressed to the IP address and port number X2, Y2 (derived from entry 512 of the Global Publishers Table 502 (FIG. 5A)) associated with the line module 102(2) on which the publishing component 202(2)(1) resides. Thereafter, the packet is sent to the underlying communication network. Based upon the IP address and port number, the packet is routed to the communication coordinator 204(2) of line module 102(2). In response to the message, the communication coordinator 204(2) updates its Local Subscribers Table 404 (FIG. 4B) to include the subscriber information contained in the packet. In this example, the communication coordinator 204(2) creates and populates entry 414 with the subscriber information. Note that entry 414 contains the same information as entry 516 of the Global Subscribers Table 504 (FIG. 5B). In this manner, in response to a publication registration, subscriber information is obtained from the namespace server 210 and stored into the Local Subscribers Table 404. The publication registration process is thus completed.

Client/Server Registration

As noted previously, the CFM is capable of supporting client/server operation as well as publish/subscribe communication. In one embodiment, client/server operation is supported using namespaces, and as is the case with publish/subscribe communication, use of the namespaces is registered before the namespaces are invoked. To illustrate the client/server registration process, reference will be made to an example.

Suppose that application component 202(1)(1) of line module 102(1) (FIG. 2) wishes to register itself as a server for the operation identified by the namespace "/LM/1/monitor/op/get". To register this use of the namespace, the application component 202(1)(1) sends a server announcement message to the communication coordinator 204(1). In this message, the application component 202(1)(1) provides: (1) the namespace "/LM/1/monitor/op/get" for which it will be acting as a server; (2) a reference (P1) back to itself; (3) an indication of what type of message delivery reliability is desired when this operation is invoked; and (4) an indication of a desired priority. In response to the server announcement message, the communication coordinator 204(1) updates the Local Servers Table 306 (FIG. 3C) for line module 102(1) by creating a new entry 320 in the table 306. In the new entry 320, the namespace "/LM/1/monitor/op/get" is stored in the Namespace column, and the reference (P1) back to the server component 202(1)(1) is stored in the "Reference to Server" column. In addition, the IP address and port number (X1, Y1) of the line module 102(1) on which the server component 202(1)(1) resides are stored in the IP Address/Port# column, the reliability indication is stored in the Reliability column, and the priority indication is stored in the Priority column. The Local Servers Table 306 is thus updated.

Thereafter, the communicator coordinator 204(1) proceeds to send a server announcement message to the namespace server 210 of the control module 112(1). In this message, the communication coordinator 204(1) provides: (1) the server namespace ("LM/l/monitor/op/get") being registered; (2) the reference P1 back to the server component 202(1)(1); (3) the IP address and port number (X1, Y1) of the line module 102(1); (4) the reliability indication; and (5) the priority indication. In response to this message, the namespace server 210 creates a new entry 520 in the Global Servers Table 506 (FIG. 5C), and stores the above-provided information into the corresponding columns of the entry 520. The Global Servers Table 506 is thus updated.

Thereafter, the namespace server 210 checks the Global Clients Table 508 (FIG. 5D) to determine whether there are any clients for the newly registered server namespace "LM/l/monitor/op/get". If there are clients for the namespace, then the namespace server 210 provides information pertaining to the server component 202(1)(1) to each communication coordinator 204 associated with each client. For the time being, however, it will be assumed that entry 526 of the Global Clients Table 508 does not yet exist and that there are no current clients for the namespace "/LM/1/monitor/op/get". Hence, the server registration process is thus completed.

To illustrate the client registration process, suppose that application component 202(1)(n) of line module 102(1) wishes to register as a client to the namespace "/LM/2/foo/op/set". To register this use of the namespace, the application component 202(1)(n) sends a client announcement message to the communication coordinator 204(1). In this message, the application component 202(1)(n) provides: (1) the namespace "µM/2/foo/op/set" to which is it registering to be a client; and (2) a reference (S1) back to itself. In response to the client announcement message, the communication coordinator 204(1) updates the Local Clients Table 308 (FIG. 3D) for line module 102(1) by creating a new entry 324. In the new entry 324, the namespace "/LM/2/foo/op/set" is stored in the Namespace column, and the reference (S1) back to the client component 202(1)(n) is stored in the "Reference to Client" column. In addition, the IP address and port number (X1, Y1) of the line module 102(1) on which the client component 202(1)(n) resides is stored in the IP address/Port # column. The Local Clients Table 308 is thus updated.

Thereafter, the communicator coordinator 204(1) sends a client announcement message to the namespace server 210 of the control module 112(1). In this message, the communication coordinator 204(1) provides: (1) the namespace ("LM/2/foo/op/set") for which registration is being made; (2) the reference S1 back to the client component 202(1)(n); and (3) the IP address and port number (X1, Y1) of the line module 102(1) on which the client component 202(1)(n) resides. In response to this message, the namespace server 210 creates a new entry 524 in the Global Clients Table 508 (FIG. 5D), and stores the above-provided information into the corresponding columns of the entry 524. The Global Clients Table 508 is thus updated.

Thereafter, the namespace server 210 checks the Global Servers Table 506 (FIG. 5C) to determine whether any server has registered to serve the namespace "/LM/2/foo/op/set". If so, then the namespace server 210 provides information pertaining to the server to the communication coordinator 204(1) associated with the client component 202(1)(n). For the time being, however, it will be assumed that entry 522 of the Global Servers Table 506 does not yet exist and that there are no current servers for the namespace "/LM/2/foo/op/set". Hence, the namespace server 210 informs the communication coordinator 204(1) that there is currently no server for the namespace "/LM/2/foo/op/set". The client registration process is thus completed.

Suppose now that the application component 202(2)(1) of line module 102(2) wishes to register itself as a server for the namespace "/LM/2/foo/op/set". To register this use of the namespace, the application component 202(2)(1) sends a server announcement message to the communication coordinator 204(2). In this message, the application component 202(2)(1) provides: (1) the namespace "/LM/2/foo/op/set" for which it is registering as a server; (2) a pointer (P2) back to itself; (3) a reliability indication; and (4) an indication of a desired priority. In response to the server announcement message, the communication coordinator 204(2) updates the Local Servers Table 406 (FIG. 4C) for line module 102(2) by creating a new entry 420. In the new entry 420, the namespace "/LM/2/foo/op/set" is stored in the Namespace column, the reference (P2) back to the server component 202(2)(1) is stored in the "Reference to Server" column. In addition, the IP address and port number (X2, Y2) of the line module 102(2) on which the server component 202(2)(1) resides is stored in the IP address/Port# column, the reliability indication is stored in the Reliability column, and the priority indication is stored in the Priority column. The Local Servers Table 406 is thus updated.

Thereafter, the communicator coordinator 204(2) proceeds to send a server announcement message to the namespace server 210 of the control module 112(1). In this message, the communication coordinator 204(2) provides: (1) the namespace ("LM/2/foo/op/set") being registered; (2) the reference P2 back to the server component 202(2)(1); (3) the IP address and port number (X2, Y2) of the line module 102(2) on which the server component 202(2)(1) resides; (4) the reliability indication; and (5) the priority indication. In response to this message, the namespace server 210 creates a new entry 522 in the Global Servers Table 506 (FIG. 5C), and stores the above-provided information into the corresponding columns of the entry 522. The Global Servers Table 506 is thus updated.

Thereafter, the namespace server 210 checks the Global Clients Table 508 (FIG. 5D) to determine whether there are any clients for the newly registered server namespace "/LM1/lfoo/op/set". In making this determination, the namespace server 210 scans through the table 508, and checks for all matches of the newly registered server namespace. For each matching namespace (which indicates a client of the server namespace), the namespace server 210 sends a message to a communication coordinator 204 corresponding to the client. The purpose of this message is to pass on, to the communication coordinator 204, information pertaining to the newly registered server namespace. In the present example, a single namespace match is found, namely, the namespace stored in entry 524. Thus, the namespace server 210 sends a message to a single corresponding communication coordinator 204.

To do so, the namespace server 210 in one embodiment, first creates a server message packet. The namespace server 210 stores within this message packet all of the information pertaining to the newly registered server namespace. Specifically, in one embodiment, the message includes: (1) the server namespace "/LM/2/foo/op/set"; (2) the reference P2 back to the server component 202(2)(1); (3) the IP address and port number of the line module 102(2) on which the server component 202(2)(1) resides; (4) the reliability indication; and (5) the priority indication. Once created, the packet is addressed to the IP address and port number X1, Y1 (derived from entry 524 of the Global Clients Table 508 (FIG. 5D)) of the line module 102(1) on which the client component 202(1)(n) resides (recall from previous discussion that component 202(1)(n) has registered as a client to the namespace "/LM/2/foo/op/set"). Thereafter, the namespace server 210 sends the message to the underlying communication network. Based upon the IP address and port number, the packet is routed to the communication coordinator 204(1) of the line module 102(1) on which the client component 202(1)(n) resides.

In response to the message, the communication coordinator 204(1) updates its Local Servers Table 306 (FIG. 3C) to include the server information contained in the packet. In this example, the communication coordinator 204(1) creates a new entry 322 and populates its with the server information contained in the packet. Note that entry 322 contains the same information as entry 522 of the Global Servers Table 506 (FIG. 5C). Once the new entry 322 is created and populated, the server registration process is completed. In this manner, in response to a server registration request made by a server component 202(2)(1) on one line module 102(2), server information is sent from the namespace server 210 to the communication coordinator 204(1) on another line module 102(1). In this way, the namespace server 210 maintains client/server information throughout the entire switch 100.

In the above example, for the sake of simplicity, only one matching namespace was shown in the Global Clients Table 508. In many implementations, however, multiple matching namespaces (i.e. multiple clients) may be found. In such cases, the namespace server 210 would, for each matching namespace, send a server message packet to a corresponding communication coordinator 204, in the manner described above.

Suppose now that application component 202(2)(n) of line module 102(2) wishes to register as a client to the namespace "/LM/1/monitor/op/get". To register this use of the namespace, the application component 202(2)(n) sends a client announcement message to the communication coordinator 204(2). In this message, the application component 202(2)(n) provides: (1) the namespace "/LM/1/monitor/op/get" to which is it registering to be a client; and (2) a reference (S2) back to itself. In response to the client announcement message, the communication coordinator 204(2) updates the Local Clients Table 408 (FIG. 4D) for line module 102(2) by creating a new entry 424. In the new entry 424, the namespace "/LM/1/monitor/op/get" is stored in the Namespace column, and the reference (S2) back to the client component 202(2)(n) is stored in the "Reference to Client" column. In addition, the IP address and port number (X2, Y2) of the line module 102(2) on which the client component 202(2)(n) resides is stored in the IP address/Port # column. The Local Clients Table 408 is thus updated.

Thereafter, the communicator coordinator 204(2) sends a client announcement message to the namespace server 210 of the control module 112(1). In this message, the communication coordinator 204(2) provides: (1) the namespace ("LM/l/monitor/op/get") for which registration is being made; (2) the reference S2 back to the client component 202(2)(n); and (3) the IP address and port number (X2, Y2) of the line module 102(2) on which the client component 202(2)(n) resides. In response to this message, the namespace server 210 creates a new entry 526 in the Global Clients Table 508 (FIG. 5D), and stores the above-provided information into the corresponding columns of the entry 526. The Global Clients Table 508 is thus updated.

Thereafter, the namespace server 210 checks the Global Servers Table 506 (FIG. 5C) to determine whether any server has registered to service the namespace "/LM/1/monitor/op/get". If so, then the namespace server 210 extracts information pertaining to the server from the Global Servers Table 506, and provides that information to the communication coordinator 204(2) associated with the client component 202(2)(n). In the present example, there is a registered server for the namespace "/LM/1/monitor/op/get" (entry 520). Thus, the namespace server 210 sends information pertaining to this server to the communication coordinator 204(2).

To do so, the namespace server 210, in one embodiment, creates a server message packet. The namespace server 210 stores within this message packet all of the information extracted from entry 520 of the Global Servers Table 506. The packet is then addressed to the IP address and port number X2, Y2 (derived from entry 526 of the Global Clients Table 508 (FIG. 5D)) associated with the line module 102(2) on which the client component 202(2)(n) resides. Thereafter, the packet is sent to the underlying communication network. Based upon the IP address and port number, the packet is routed to the communication coordinator 204(2) of line module 102(2). In response to the message, the communication coordinator 204(2) updates its Local Servers Table 406 (FIG. 4C) to include the server information contained in the packet. In this example, the communication coordinator 204(2) creates and populates entry 422. Note that entry 422 contains the same information as entry 520 of the Global Servers Table 506 (FIG. 5C). In this manner, in response to a client registration, server information is obtained from the namespace server 210 and stored into the Local Servers Table 406.

Operation

After namespaces are properly registered with the communication coordinators 204 and the namespace server 210, the CFM is ready for normal operation. At this point, it should be noted that in one embodiment, registration for publication and server invocation are optional. That is, if so desired, an application component 202 may publish an event to a namespace without first registering as a publisher to that namespace. Likewise, an application component 202 may invoke an operation associated with a namespace without first registering as a client for that namespace. If an application component 202 chooses to forego the registration process, then the first time it publishes to a namespace or invokes an operation associated with a namespace, the CFM will, in one embodiment, automatically perform the registration process described above. After the namespace is registered, the CFM will proceed to carry out the publication or invocation functions.

Publish/Subscribe Communication

To illustrate how publish/subscribe communication is implemented by the CFM in accordance with one embodiment of the present invention, reference will be made to an example. The following example will refer to the sample tables shown in FIGS. 3A–3B, as well as the functional block diagram shown in FIG. 2.

Suppose that application component 202(1)(1) wishes to publish an event to namespace "/LM/1/monitor/event/LOS". To do so, it sends a publication message to communication coordinator 204(1). In this message, the publishing component 202(1)(1) provides: (1) the namespace to which it is publishing; (2) the content of the message (e.g. event data); and (3) a desired publication mode. In one embodiment, a message may be published in broadcast or unicast mode. For the time being, it will be assumed that the publishing component specifies unicast mode.

In response to the publication message, the communication coordinator 204(1) scans the Local Subscribers Table 304 in search of all subscribers to the namespace specified in the publication message. In the present example, only one subscriber is found, namely, the one specified in entry 314 of table 304. In other circumstances, however, multiple subscribers may be found. For each subscriber (i.e. each matching entry) found in the Local Subscribers Table 304, the communication coordinator 204(1) performs the following.

Initially, the communication coordinator 204(1) extracts information from the various columns of the matching entry 314, including the reference (S2) to the subscribing component (recall from previous discussion that the subscribing component is component 202(2)(n) of line module 102(2)), the IP address and port number (X2, Y2) of the line module 102(2) on which the subscribing component resides, the reliability indication, and the priority indication. Thereafter, the communication coordinator 204(1), in one embodiment, creates a publication message packet. Within this packet, the communication coordinator 204(1) stores: (1) the namespace to which publication is being made; (2) the message content received from the publishing component 202(1)(1); (3) the reference (S2) to the subscribing component 202(2)(n); (4) the reliability specified in the matching entry 314; (5) the priority specified in the matching entry 314, and (6) the IP address and port number (X1, Y1) of the line module 102(1) on which the publishing component 202(1)(1) resides. The communication coordinator 204(1) then addresses the message packet to the IP address and port number (X2, Y2) of the module 102(2) on which the subscribing component 202(2)(n) resides, and sends the packet into the communication network in accordance with the reliability and priority specified in the matching entry. In the present example, the specified reliability is "best effort"; thus, the communication coordinator 204(1) does not expect any acknowledgment of the message packet. Based upon the IP address and port number, the message packet is routed to the communication coordinator 204(2) of line module 102 (2).

Upon receiving the publication message packet, the communication coordinator 204(2) in one embodiment performs several functions. Initially, it determines based upon the reliability indication contained in the message packet whether an acknowledgment needs to be sent back to the originating communication coordinator 204(1). In this example, the reliability is "best effort"; thus, no acknowledgment of the message needs to be sent. Thereafter, the communication coordinator 204(2) creates a publication message to be forwarded to the subscribing component 202(2)(n). In one embodiment, the communication coordinator 204(2) inserts into this message: (1) the namespace to which publication is being made; and (2) the message content provided by the publishing component 202(1)(1). Once the publication message is created, the communication coordinator 204(2) accesses the subscribing component 202(2)(n) using the subscriber reference S2 provided by the originating communication coordinator 204(1), and forwards the publication message to the subscribing component 202(2)(n). The publication is thus delivered to the subscribing component 202(2)(n). This process is used to deliver the event to each subscriber of the namespace to which publication is being made.

Broadcast

In the above example, the originating communication coordinator 204(1) creates and sends a publication message packet to each subscriber of the namespace "/LM/1/monitor/evert/LOS" found in the Local Subscribers Tables 304. If there had been multiple subscribers, multiple message packets would have been sent, one after the other, such that a series of message packets would have been sent by the communication coordinator 204(1). This is how publication is carried out in unicast mode. Currently available CFM's use unicast mode to publish events to multiple subscribers. One of the drawbacks of unicast mode is that it can lead to significant delays between the time an event is published and the time a communication coordinator 204 actually sends a publication message packet to a subscriber. More specifically, because the communication coordinator 204 sends a publication message packet to one subscriber at a time, if there is a long list of subscribers to a particular namespace, the communication coordinator 204 may take a relatively long time before it sends a publication message packet to the last subscriber on the list. For some events (such as loss of signal) in which fast response time is important, unicast mode may not be able to publish an event fast enough to all subscribers.

To overcome this problem, there is provided in one embodiment of the CFM a capability to broadcast rather than unicast an event to a namespace. In broadcast mode, a communication coordinator 204 does not send one publication message packet at a time to each subscriber. Instead, the communication coordinator 204 sends a single publication message packet concurrently to each and every other communication coordinator 204 in the CFM. It is then up to each receiving communication coordinator 204 to determine whether there are subscribers for the namespace, and to deliver the event message to those subscribers. By broadcasting an event in this manner, event messages can reach a large number of subscribers more quickly.

To illustrate how broadcast mode is implemented in accordance with one embodiment of the present invention, suppose that application component 202(1)(1) wishes to broadcast an event to namespace "/LM/1/monitor/event/LOS". To do so, the publishing component 202(1)(1) sends a publication message to communication coordinator 204 (1). In this message, the publishing component 202(1)(1) provides: (1) the namespace to which it is publishing; (2) the content of the message (e.g. event data); and (3) an indication that the event is to be broadcasted.

In response to the publication message, the communication coordinator 204(1) creates a broadcast message packet. Within this packet, the communication coordinator 204(1) stores: (1) the namespace to which publication is being made; (2) the message content received from the publishing component 202(1)(1); and (3) an indication that the message is a broadcast message. Thereafter, the communication coordinator 204(1) addresses the message packet to a special IP address that is reserved for broadcasts, and sends the packet into the communication network. Based upon the special IP address, the broadcast message packet is concurrently routed by the network to every other communication coordinator 204 of every other module in the switch 100.

Upon receiving the broadcast message packet, each communication coordinator 204 performs the following operations. For the sake of simplicity, only the operations performed by the communication coordinator 204(2) of line module 102(2) will be described. However, it should be noted that the following description applies to all of the communication coordinators 204 in the CFM.

Based upon the broadcast indication included in the broadcast message packet, the communication coordinator 204(2) determines that the packet contains a broadcast message. In response to this determination, the communication coordinator 204(2) extracts the namespace from the message packet. Using this namespace, the communication coordinator 204(2) searches through the Local Subscribers Table 404 (FIG. 4B) of line module 102(2) for all matching namespaces. In doing so, the communication coordinator 204(2) may encounter not just specific namespaces in the table 404 but also namespace expressions, such as that found in entry 412. If a namespace expression is encountered, then in one embodiment the communication coordinator 204(2) performs pattern matching to determine whether the namespace expression matches the namespace extracted from the packet. In the present example, the namespace expression in entry 412 does match the extracted namespace. Thus, a matching entry is found.

For each matching entry in the Local Subscribers Table 404, the communication coordinator 204(2) creates a publication message to be forwarded to a corresponding subscribing component. In one embodiment, the communication coordinator 204(2) inserts into this message: (1) the namespace to which publication is being made; and (2) the message content provided by the publishing component 202(1)(1). Once the publication message is created, the communication coordinator 204(2) accesses the subscribing component 202(2)(n) using the subscriber reference S2 stored in the "Reference to Subscriber" column of the matching entry, and forwards the publication message to the subscribing component 202(2)(n). The broadcast message is thus delivered to the subscribing component 202(2)(n). By broadcasting a message to all communication coordinators

204, and by having each communication coordinator 204 deliver the message to the appropriate local subscribers in this manner, the CFM makes it possible to deliver a message to a large number of subscribers in a very short amount of time.

Client/Server Operation

As noted above, the CFM is able to support client/server operation as well as publish/subscribe communication. To illustrate how client/server operation is implemented in accordance with one embodiment of the present invention, reference will be made to an example. The following example will refer to the sample tables shown in FIGS. 3C–3D, as well as the functional block diagram shown in FIG. 2.

Suppose that application component 202(1)(n) wishes to invoke the operation associated with the namespace "/LM/2/foo/op/set". To do so, it sends an invocation message to communication coordinator 204(1). In this message, the client component 202(1)(n) provides: (1) the namespace that is being invoked; (2) any information, parameters, or data that are needed to invoke the operation; and (3) a reference S1 back to itself (the client component 202(1)(n)).

In response to the invocation message, the communication coordinator 204(1) scans the Local Servers Table 306 (FIG. 3C) in search of the server for the namespace specified in the invocation message. In the present example, the server is found in entry 322 of the table 306. Once the server entry 322 is found, the communication coordinator 204(1) extracts information from the various columns of the entry 322, including the reference (P2) to the server component (recall from previous discussion that the server component is component 202(2)(1) of line module 102(2)), the IP address and port number (X2, Y2) of the line module 102(2) on which the server component resides, the reliability indication, and the priority indication.

Thereafter, the communication coordinator 204(1), in one embodiment, creates an invocation message packet. Within this packet, the communication coordinator 204(1) stores: (1) the namespace that is being invoked; (2) the information, parameters, and data provided by the client component 202(1)(n); (3) the reference (P2) to the server component 202(2)(1); (4) the reliability specified in the server entry 322; (5) the priority specified in the server entry 322, (6) the reference (S1) to the client component 202(1)(n); and (7) the IP address and port number (X1, Y1) of the line module 102(1) on which the client component 202(1)(n) resides. The communication coordinator 204(1) then addresses the message packet to the IP address and port number (X2, Y2) of the module 102(2) on which the server component 202(2)(1) resides, and sends the packet into the communication network in accordance with the reliability and priority specified in the server entry 322. In the present example, the specified reliability is "best effort"; thus, the communication coordinator 204(1) does not expect any acknowledgment of the message packet. Based upon the IP address and port number, the message packet is routed to the communication coordinator 204(2) of line module 102(2).

Upon receiving the invocation message packet, the communication coordinator 204(2) in one embodiment performs several functions. Initially, it determines based upon the reliability indication contained in the message packet whether an acknowledgment needs to be sent back to the originating communication coordinator 204(1). In this example, the reliability is "best effort"; thus, no acknowledgment of the message needs to be sent. Thereafter, the communication coordinator 204(2) saves some of the information contained within the invocation message packet. In one embodiment, this saved information includes the reliability indication, the priority indication, the IP address and port number (X1, Y1) of the line module 102(1) on which the client component 202(1)(n) resides, and the reference (S1) to the client component 202(1)(n). After saving the information, the communication coordinator 204(2) assigns a correlation tag to the saved information, which in effect is a reference to where the saved information can be found. After that is done, the communication coordinator 204(2) creates an invocation message to be forwarded to the server component 202(2)(1). In one embodiment, the communication coordinator 204(2) inserts into this message: (1) the namespace that is being invoked; (2) the information, parameters, and data provided by the client component 202(1)(n); and (3) the correlation tag. Once the invocation message is created, the communication coordinator 204(2) accesses the server component 202(2)(1) using the server reference P2 provided by the originating communication coordinator 204(1), and forwards the invocation message to the server component 202(2)(1) for processing.

Assuming that the operation being invoked is one that gives rise to a response, the server component 202(2)(1) will at some point send a response message to the communication coordinator 204(2) to be forwarded to the client component 202(1)(n). In one embodiment, this response message includes: (1) the namespace that was invoked; (2) the response information/data; and (3) the correlation tag.

Upon receiving this message, the communication coordinator 204(2) uses the correlation tag to access the saved information. Thereafter, the communication coordinator 204(2) creates a response message packet. Within this message packet, the communication coordinator stores: (1) the namespace that was invoked; (2) the response information/data; (3) the reference (S1) to the client component 202(1)(n); (4) the reliability indication; (5) the priority indication; and (6) the IP address and port number of the line module 102(2) on which the server component 202(2)(1) resides. The communication coordinator 204(2) then addresses the response message packet to the IP address and port number (X1, Y1) of the module 102(1) on which the client component 202(1)(n) resides, and sends the packet into the communication network in accordance with the specified reliability and priority. In the present example, the specified reliability is "best effort"; thus, the communication coordinator 204(2) does not expect any acknowledgment of the response message packet. Based upon the IP address and port number, the message packet is routed to the communication coordinator 204(1) of line module 102(1).

Upon receiving the response message packet, the communication coordinator 204(1) in one embodiment performs several functions. Initially, it determines based upon the reliability indication contained in the message packet whether an acknowledgment needs to be sent. In this example, the reliability is "best effort"; thus, no acknowledgment of the message needs to be sent. Thereafter, the communication coordinator 204(1) creates a response message to be forwarded to the client component 202(1)(n). In one embodiment, the communication coordinator 204(1) inserts into this message: (1) the namespace that was invoked; and (2) the response information/data provided by the server component 202(2)(1). Once the response message is created, the communication coordinator 204(1) accesses the client component 202(1)(n) using the client reference S1, and forwards the response message to the client component 202(1)(n). The response is thus delivered to the client component 202(1)(n) to complete the client/server operation.

Reliable Communication

In certain circumstances, it is desirable to implement reliable communication to ensure that important messages are received. With reliable communication, each message (except for an acknowledgment message) is acknowledged. If a sender does not receive an acknowledgment to a message, it continues to resend the message (up to a certain number of times) until an acknowledgment is received. That way, the sender ensures that the message is properly delivered to a recipient.

With reliable communication, there is a risk that a message will be delivered multiple times to a recipient. For example, suppose that a sender sends a message to a recipient, which is received and processed by the recipient. In response, the recipient sends an acknowledgment to the sender, but the acknowledgment is somehow lost and hence not received by the sender. Since an acknowledgment was not received, the sender will resend the message. If the message is again received and processed by the recipient, then the message will be processed twice. For certain implementations, such as database updates, this is a highly undesirable result.

To overcome this problem, one embodiment of the CFM provides an ability to implement reliable communication with an "at most once" guarantee. That is, the CFM ensures that a message will be delivered no more than one time to a recipient. In one embodiment, the CFM is capable of implementing "at most once" reliable communication in both publish/subscribe communication and client/server operation. To illustrate how reliable communication may be implemented in accordance with one embodiment of the present invention, reference will be made to the sample tables 208(1) and 208(2) shown in FIGS. 6 and 7, as well as the functional diagram shown in FIG. 2. FIG. 6 shows a sample embodiment for the local Reliable Communication Table 208(1) of line module 102(1), and FIG. 7 shows a sample embodiment for the local Reliable Communication Table 208(2) of line module 102(2).

Reliable Communication Initialization

In one embodiment, before reliable communication is carried out between two modules, an initialization process is carried out between the communication coordinators 204 of the two modules. To describe the initialization process, reference will be made to communication coordinators 204(1) and 204(2) on line modules 102(1) and 102(2), respectively. While communication coordinators 204(1) and 204(2) are used specifically in the following discussion, it should be noted that the discussion applies to all communication coordinators 204 on all modules of the switch 100.

In one embodiment, the first time that reliable communication is carried out between two communication coordinators 204(1), 204(2), some coordination information is exchanged, and used to update the respective Reliable Communication Tables 208(1), 208(2). In one embodiment, the exchanged information comprises a set of sequence numbers. More specifically, each communication coordinator 204, in one embodiment, randomly generates a sending sequence number, and provides it to the other communication coordinator. Thereafter, the sequence numbers are stored into the respective Reliable Communication Tables 208, along with other information.

Assuming that reliable communication is being initiated between the communication coordinators 204(1) and 204(2), the initialization process may be carried out as follows. Initially, the communication coordinator 204(1) sends an INIT message packet to the other communication coordinator 204(2) to initiate reliable communication. Included in this message packet is a sending sequence number (2040 in this example) that the communication coordinator 204(1) has randomly generated. Also included in the message packet is the IP address and port number of the line module 102(1) on which the initiating communication coordinator 204(1) resides. In addition to sending the INIT message packet, the communication coordinator 204(1) also creates and populates an entry 610 in the local Reliable Communication Table 208(1) (FIG. 6). Specifically, it stores: (1) the IP address and port number (X2, Y2) of the line module 102(2) on which the other communication coordinator 204(2) resides into the IP Address/Port# column; and (2) the sending sequence number (2040) that it just generated into the Sending Sequence # column.

In response to the INIT message packet, the other communication coordinator 204(2) randomly generates its own sending sequence number (50 in this example). The communication coordinator 204(2) then creates and populates an entry 710 in its local Reliable Communication Table 208(2) (FIG. 7). Specifically, it stores: (1) the IP address and port number (X1, Y1) of the line module 102(1) on which the initiating communication coordinator 204(1) resides into the IP Address/Port# column; (2) the sending sequence number (50) that it just generated into the Sending Sequence # column; and (3) the sequence number (2040) received from the initiating communication coordinator 204(1) into the Receiving Sequence # column. Thereafter, the communication coordinator 204(2) sends a return message packet to the initiating communication coordinator 204(1). Included in this message packet are the sequence number (50) that the communication coordinator 204(2) just generated, and the IP address and port number (X2, Y2) of the line module 102(2) on which the communication coordinator 204(2) resides.

In response to the return message packet, the initiating communication coordinator 204(1) extracts the IP address and port number (X2, Y2) from the return message, and uses them to look up the proper entry 610 in the local Reliable Communication Table 208(1) (FIG. 6). Once the proper entry 610 is found, the sequence number (50) received from the other communication coordinator 204(2) is stored into the Receiving Sequence # column of the entry 610. The initialization process is thus completed. The communication coordinators 204(1) and 204(2) are now ready to carry out reliable communication with each another. Sending and Receiving a Reliable Communication Suppose now that the communication coordinator 204(1) wishes to send a reliable message to communication coordinator 204(2), which resides on line module 102(2) having IP address and port number X2, Y2. This message may, for example, be a publication message from one of the application components 202(1)(1)–202(1)(n) on line module 102(1) to one of the application components 202(2)(1)–202(2)(n) on line module 102(2), or it may be an operation invocation made by one of the application components 202(1)(1)–202(1)(n) on line module 102(1) to one of the application components 202(2) (1)–202(2)(n) on line module 102(2). In either case, to send the message, the communication coordinator 204(1) first creates a message packet. Depending upon the type of message, this message packet comprises all of the information described above in connection with publish/subscribe communication and client/server operation.

In addition to this information, the message packet also includes a sequence number. In one embodiment, this sequence number is derived by incrementing a current sending sequence number. In the current example, the communication coordinator 204(1) accesses the local Reliable Communication Table 208(1) (FIG. 6) to find the entry 610 corresponding to the IP address and port number (X2, Y2) of the line module 102(2) on which the other communication coordinator 204(2) resides. Once the proper entry 610 is found and accessed, the communication coordinator 204(1) obtains the current sending sequence number (2040) from the entry 610, and increments it to derive 2041. This is the sequence number that is inserted into the message packet. The new sequence number 2041 is also stored back into the Sending Sequence # column of the entry 610 to update the entry 610. After the new sending sequence number is included in the message packet, the message packet is sent into the communication network, and unless an error occurs, is routed to communication coordinator 204(2) of line module 102(2). After sending the message packet, the communication coordinator 204(1) waits for an acknowledgment. If one is not received within a certain amount of time, the communication coordinator 204(1) resends the message. This continues until either an acknowledgment message is received, or the message packet has been sent a maximum number of times. If receipt of the message packet is not eventually acknowledged, the communication coordinator 204(1) informs the application component 202(1)(1)–202(1)(n) that sent it the message that message delivery failed.

Assuming that no error occurs, the communication coordinator 204(2) receives the message packet, and upon receiving the message packet, the communication coordinator 204(2) determines from the contents of the message that reliable communication is desired (recall from previous discussion that a reliability indication is included in a message packet). Thus, it sends an acknowledgment message packet back to the originating communication coordinator 204(1) to confirm that it has received the message packet. Thereafter, the communication coordinator 204(2) extracts the IP address and port number of module 102(2) from the message packet, and uses these to find and access the proper entry 710 in the local Reliable Communication Table 208(2). From the entry 710, the communication coordinator 204(2) obtains the current receiving sequence number from the Receiving Sequence # column. The current receiving sequence number is then compared against the sequence number included in the message packet to determine the next action. In one embodiment, at least three scenarios may arise.

A first scenario is that the sequence number 2041 in the message packet is one greater than the current receiving sequence number 2040 in the entry 710, as is the case in this example. If this is the case, then it means that no error occurred. Thus, the communication coordinator 204(2): (1) updates the entry 710 by storing the new sequence number 2041 into the Receiving Sequence # column; and (2) delivers the message to the appropriate application component 202(2)(1)–202(2)(n) using a component reference, in the same manner as that described previously. Reliable communication is thus achieved.

A second scenario that may arise is that the sequence number in the message packet is greater than the current sequence number by more than one. If that is the case, then it means that one or more intermediate messages were not delivered properly. For example, if the sequence number in the message packet is 2043 and the current receiving sequence number is 2040, then it means that the messages having sequence numbers 2041 and 2040 were not delivered properly. In such a scenario, the communication coordinator 204(2) performs at least three operations. First, it adds the intermediate sequence numbers (e.g. 2041, 2042) to the Missing Sequence Number List column of entry 710 (if those sequence numbers are not already on the list). Second, it updates the entry 710 by storing the new sequence number (e.g. 2043) into the Receiving Sequence # column. In addition, it delivers the message to the appropriate application component 202(2)(1)–202(2)(n) using a component reference, in the same manner as that described previously. In this manner, the entry 710 is maintained/updated, and the message is delivered to the proper component 202(2)(1)–202(2)(n).

A third scenario that may arise is that the sequence number in the message packet is smaller than the current receiving sequence number in entry 710. If that is the case, then it means that the message packet is being delivered out of sequence. To determine what actions to take, the communication coordinator 204(2) checks the missing sequence number list of entry 710. If the sequence number in the message packet is one of the numbers in the missing sequence number list, then it means that this message packet has not been received before. Thus, the communication coordinator 204(2) delivers the message to the appropriate application component 202(2)(1)–202(2)(n) using a component reference, in the same manner as that described previously. In addition, the communication coordinator 204(2) removes the sequence number in the message packet from the missing sequence number list of entry 710. In this manner, the entry is properly maintained/updated, and the message is properly delivered.

On the other hand, if the sequence number in the message packet is not one of the numbers in the missing sequence number list, then it means that this message packet has been received before, and hence, the message has already been delivered to the proper component 202(2)(1)–202(2)(n). That being the case, the communication coordinator 204(2) discards the message packet, and foregoes delivery of the message to any of the application components 202(2)(1)–202(2)(n). By doing so, the communication coordinator 204(2) prevents multiple deliveries of the same message. In this manner, the communication coordinator 204(2) enforces the "at most once" reliable communication guarantee.

High Availability

In many implementations, it is desirable for the switch 100 to be highly available. High availability means that the switch 100 maintains normal operation a high percentage of the time, even in the face of various errors/failures. In some implementations, the switch 100 cannot have any more than a few minutes of downtime each year. To maintain such high availability, the switch 100 has to be quite tolerant of errors and failures.

Redundancy

Figure 8:
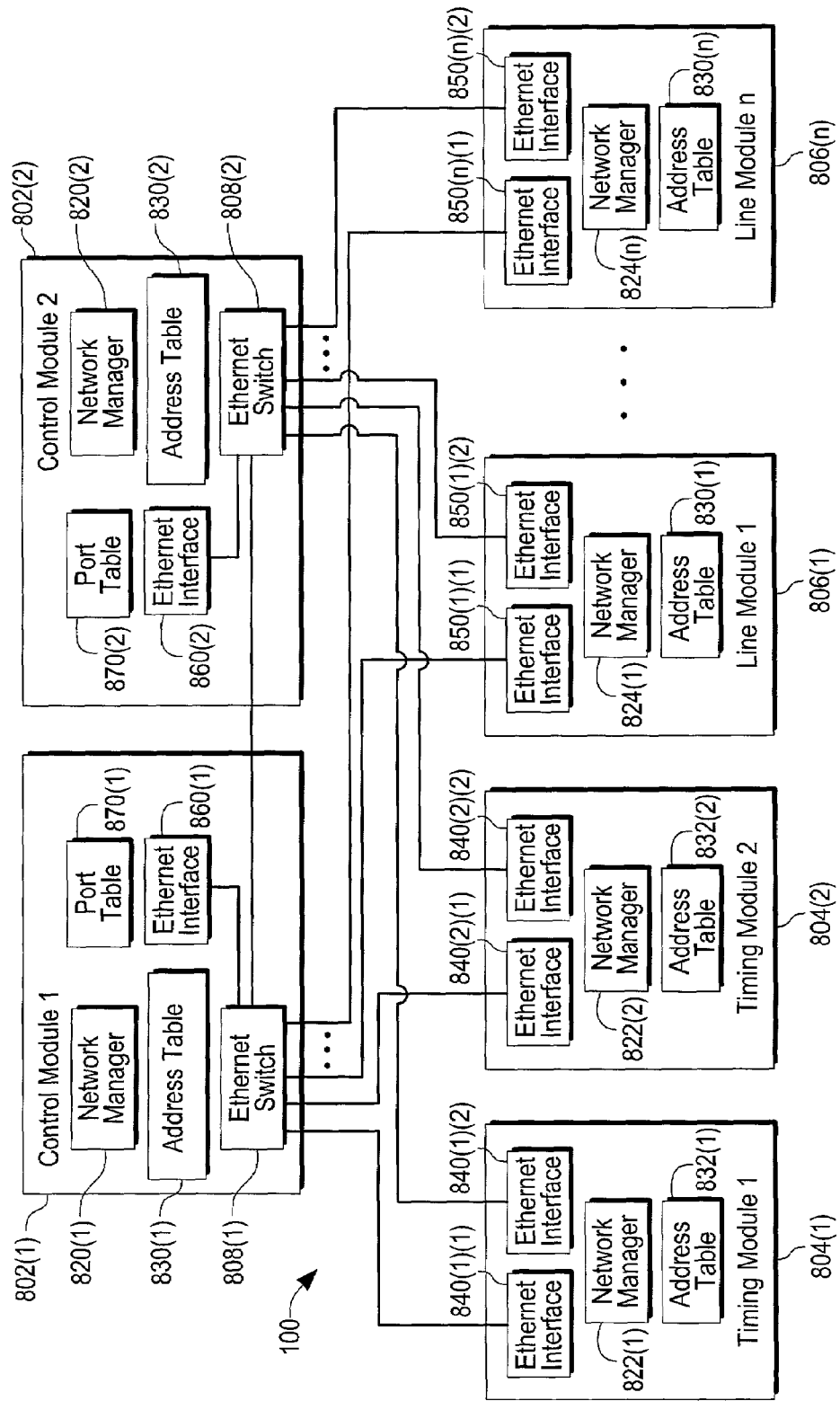
FIG. 8 is a functional block diagram of the system of FIG. 1 illustrating various components that enable high availability to be achieved.

In one embodiment, to maintain high availability, the switch 100 provides for some redundancy. This redundancy is shown in the functional block diagram of FIG. 8. FIG. 8 shows the interconnections between the Ethernet interfaces and the Ethernet switches that FIGS. 1A and 1B do not show. As shown in FIG. 8, each timing module 804 of the switch 100 comprises two Ethernet interfaces 840, and each line module 806 comprises two Ethernet interfaces 850. For each module, either interface can be used to convey information between the module and the rest of the network. For example, for line module 1 806(1), either interface 850(1)(1) or 850(1)(2) may be used to effect network communication.

By providing two interfaces in this manner, if one interface fails, then the other interface may be used to convey network traffic; thus, even in the event of an interface failure, normal operation may be maintained.

Redundancy is also provided in the network switching function. As shown in FIG. 8, each control module 802 comprises an Ethernet switch 808. Each Ethernet switch 808 is coupled to a different set of interfaces on the other modules. More specifically, the first Ethernet switch 808(1) is coupled to the first Ethernet interface 840(1)(1), 840(2)(1), 850(1)(1), 850(n)(1) on each timing module 804 and line module 806, while the second Ethernet switch 808(2) is coupled to the second Ethernet interface 840(1)(2), 840(2)(2), 850(1)(2), 850(n)(2) of each timing module 804 and line module 806. With the Ethernet switches 808 and interfaces 840, 850 connected in this manner, there are in effect two distinct networks that couple the various modules to each other: one managed by Ethernet switch 808(1) and another managed by Ethernet switch 808(2). Either network can be used to convey information from one module to another. As a result, if one Ethernet switch 808 is disabled or fails (thereby disabling one network), then the other Ethernet switch 808 (and hence the other network) may be used to convey network traffic. This redundancy allows a control module 802 to be disabled or fail without disabling the overall switch 100. In addition to being coupled to the interfaces 840, 850 of the timing and line modules, the Ethernet switches 808 in one embodiment are also coupled to each other. As will be explained in greater detail in a later section, this connection enables the control modules 802 to communicate with each other. It also enables an interface coupled to one network to communicate with an interface coupled to the other network.

In addition to physical redundancy, there is also functional redundancy. As shown in FIG. 8, there are two control modules 802(1), 802(2), and two timing modules 804(1), 804(2). Either module in each module pair is capable of acting as either the primary or secondary module. For example, either control module 802(1), 802(2) can act as the primary control module. Whichever module is not the primary control module will automatically function as the secondary control module. Similarly, either timing module 804(1), 804(2) can act as the primary timing module. Whichever module is not the primary timing module will automatically behave as the secondary timing module. Given this functional redundancy, should a primary module become disabled or fail, the secondary module will automatically take over the functions of the primary module. Thus, even if a failure occurs, normal operation of the switch 100 is maintained.

The redundancy discussed above is quite advantageous for enabling high availability. However, if not managed properly, it could render other parts of the switch 100 much more complex and inefficient. As described previously, the components of the CFM carry out inter-module communication using IP addresses. These IP addresses are stored in the local tables 206 (FIG. 2) on each module, and in the global tables 212 of the control module 112(1). Once stored within these tables, it is desirable not to have to change these IP addresses, since doing so would involve a substantial amount of processing, which would greatly burden the overall switch 100. If the IP addresses of the redundant components are not managed efficiently, however, it may very well lead to the need to update the IP addresses stored in the tables 206, 212.

To elaborate, in one embodiment, each Ethernet interface 840, 850 has its own associated MAC (media access control) address, which enables it to be accessed on the network by a corresponding Ethernet switch 808. This MAC address is a low level static network address (below the IP level), and is typically associated with or mapped to a static IP address. Typically, there is a one to one correspondence between a MAC address and an IP address, so that each Ethernet interface 840, 850 has an associated static MAC address and an associated static IP address. For instance, interface 850(1)(1) on line module 806(1) may have a static MAC address MAC1 and a static IP address IP1. Similarly, interface 850(1)(2) on the same line module 806(1) may have a static MAC address MAC2 and a static IP address IP2. These static addresses may be used to specifically access each interface. If these static IP addresses are used by the CFM to convey information to the line module 806(1), then the IP address for communicating with the line module 806(1) may change depending upon which interface 850(1)(1), 850(1)(2) is currently being used by the line module 806(1). This in turn may lead to the need to update IP addresses stored in the local tables 206 and the global tables 212.

To illustrate, suppose that interface 850(1)(1) is currently being used by line module 806(1) to communicate with the network. Since in this example the static IP address of interface 850(1)(1) is IP1, the IP address that should be used to convey information to line module 806(1) is also IP1. Entries in the local tables 206 and global tables 212 that pertain to line module 806(1) would contain this IP address IP1. Suppose now that interface 850(1)(1) suffers a failure, thereby causing line module 806(1) to switch over to interface 850(1)(2). Since interface 850(1)(2) has a different IP address than interface 850(1)(2), this switchover causes the IP address for communicating with module 806(1) to change to the IP address of interface 850(1)(2), namely, IP2 in this example. This in turn means that all of the entries in the local tables 206 and global tables 212 that pertain to line module 806(1) that currently contain references to IP1 need to be updated to refer to IP2, if the CFM is to continue to function properly. As noted previously, updating the tables 206, 212 in this manner is processing intensive and highly inefficient. Thus, it should be avoided if possible.

Virtual IP Addresses

To avoid having to update the IP addresses in the tables 206, 212, the switch 100 in one embodiment implements virtual IP addresses. Unlike a static IP address, a virtual IP address is not statically mapped to a specific MAC address. Rather, a virtual IP address may be dynamically mapped to any one of a plurality of MAC addresses. By dynamically mapping a virtual IP address, it is possible to move or "float" a virtual IP address from one MAC address to another. By floating a virtual IP address between different MAC addresses, it is possible to use the same virtual IP address to access a particular component, regardless of the MAC addresses of the underlying network communication mechanisms.

For example, suppose that a virtual IP address LM1 is assigned to line module 1 806(1). Suppose further that this virtual IP address may be dynamically mapped to either the MAC address of interface 850(1)(1) or the MAC address of interface 850(1)(2). If interface 850(1)(1) is currently being used by line module 806(1) to communicate with the network, then the virtual IP address LM1 will be mapped to the MAC address of interface 850(1)(1). On the other hand, if interface 850(1)(2) is currently being used to communicate with the network, then the virtual IP address LM1 will be mapped to the MAC address of interface 850(1)(2). With this setup, it does not matter from an IP address point of view which interface is currently being used by line module 806(1) to effect network communication. The same virtual IP address LM1 may be used to communicate with line module 806(1) regardless. Thus, by implementing virtual IP addresses, and by dynamically mapping the virtual IP addresses to various MAC addresses, it is possible for IP addresses to remain constant even in the face of redundancy. If the CFM uses these constant virtual IP addresses to effect inter-module communication, then there will be no need to update the local and global tables 206, 212 when a switchover occurs.

In one embodiment, two sets of virtual IP addresses are implemented within the switch 100. One set is module-based. This is the type of virtual IP address discussed above, wherein a virtual IP address is assigned to each particular module, and is allowed to float between the MAC addresses of the interfaces on that module. In one embodiment, a module-based virtual IP address is assigned to each module in the switch 100, including the control modules 802, even though each control module 802 comprises just one interface 860. In the case of the control modules 802, the module-based virtual IP address is mapped to the MAC address of the Ethernet interface 860 on that control module. Whenever it is desirable to communicate with a particular module in the switch 100, the module-based virtual IP address assigned to that module may be used. This is true regardless of the interface that that module is currently using to effect network communication. For purposes of the following discussion, the module-based virtual IP addresses are assigned as follows: (1) LM1 and LMn for lines modules 806(1) and 806(n), respectively; (1) TM1 and TM2 for timing modules 804(1) and 804(2), respectively; and (3) CM1 and CM2 for control modules 802(1) and 802(2), respectively.

Switch 100 also implements a role-based set of virtual IP addresses. As the name suggests, these virtual IP addresses float from module to module, depending upon the role that a module is playing at a particular time. The role-based virtual IP addresses are particularly relevant to the control modules 802 and timing modules 804. As noted previously, both control modules 802 are capable of acting as either the primary control module or the secondary control module. Likewise, both timing modules 804 are capable of acting as either the primary timing module or the secondary timing module. Since the roles played by these modules 802, 804 are not predetermined, and even after being determined, may change in the course of operation, role-based virtual IP addresses are assigned to enable other modules in the switch 100 to always use the same IP address to access a module playing a particular role (e.g. primary control module). For purposes of discussion, it will be assumed that the role-based IP addresses are assigned as follows: (1) CMP and CMS for the primary control module and the secondary control module, respectively; and (2) TMP and TMS for the primary timing module and the secondary timing module, respectively.

In one embodiment, these role-based virtual IP addresses float from module to module. For example, if control module 802(1) is acting as the primary control module, then it will host the virtual IP address CMP (i.e. CMP will be mapped to the MAC address of Ethernet interface 860(1)), and the other control module 802(2) will host the virtual IP address CMS. On the other hand, if control module 802(2) is acting as the primary control module, then it will host the virtual IP address CMP, and the other control module 802(1) will host the virtual IP address CMS. The virtual IP addresses TMP and TMS may also float between the timing modules 804 in the same way. By floating the role-based virtual IP addresses from module to module in this manner, it is possible to access a module playing a particular role (e.g. primary control module) using a virtual IP address without knowing which module is actually playing that role at that time. For example, by using the IP address CMP, a module can always access the primary control module, regardless of which control module 802 is acting as the primary control module at that time. This greatly simplifies the process of accessing a module. In one embodiment, each module is capable of hosting a role-based virtual IP address, even a line module 806. However, because each line module 806 has only one role, the role-based virtual IP address for a line module 806 does not float from module to module. In the following discussion, it will be assumed that each line module is a primary line module; thus, the role-based virtual IP address for each line module 806 is the module-based virtual IP address for that module followed by a "P". For example, for line module 1 806(1), the module-based virtual IP address is LM1, and the role-based virtual IP address is LM1P.

Network Managers

To render the virtual IP addresses discussed above effective, some underlying dynamic mapping is performed to properly map the virtual IP addresses to the proper MAC addresses. In one embodiment, this dynamic mapping function is performed by the network manager components 820, 822, 824 residing on each module. In one embodiment, the network managers 820, 822, 824 are derived on each module by having the processor 118 (FIG. 1) on that module execute a set of network manager instructions stored in the storage 120 of that module. As an alternative, the functions of the network managers 820, 822, 824 may be implemented by way of specially configured hardware logic components. These and other implementations of the network managers 820, 822, 824 are within the scope of the present invention.

In one embodiment, in carrying out the mapping function, the network managers 820, 822, 824 make reference to local address tables 830, 832, 834. In the local address tables 830, 832, 834, there is stored information that maps IP addresses (both static and virtual) to MAC addresses. As will be explained in greater detail in a later section, the network managers 820, 822, 824 maintain and use the information in the local address tables 830, 832, 834 to carry out network communication.

In addition to maintaining the local address tables 830, 832, the network managers 820, 822 on the control and timing modules also implement some role arbitration logic. This logic enables the control modules 802 and timing modules 804 to determine which module acts as the primary module and which acts as the secondary module. For purposes of the present invention, any arbitration scheme may be used. For example, a race scheme may be used in which the first module to be up and running is the primary module and other is the secondary module. Alternatively, a priority scheme may be used in which one module is by default the primary module and the other is the secondary module. These and other arbitration schemes may be used. Whatever scheme is implemented, the role arbitration logic enables the control and timing modules to determine their roles in the switch 100.

Address/Namespace Hierarchy

Figure 9:
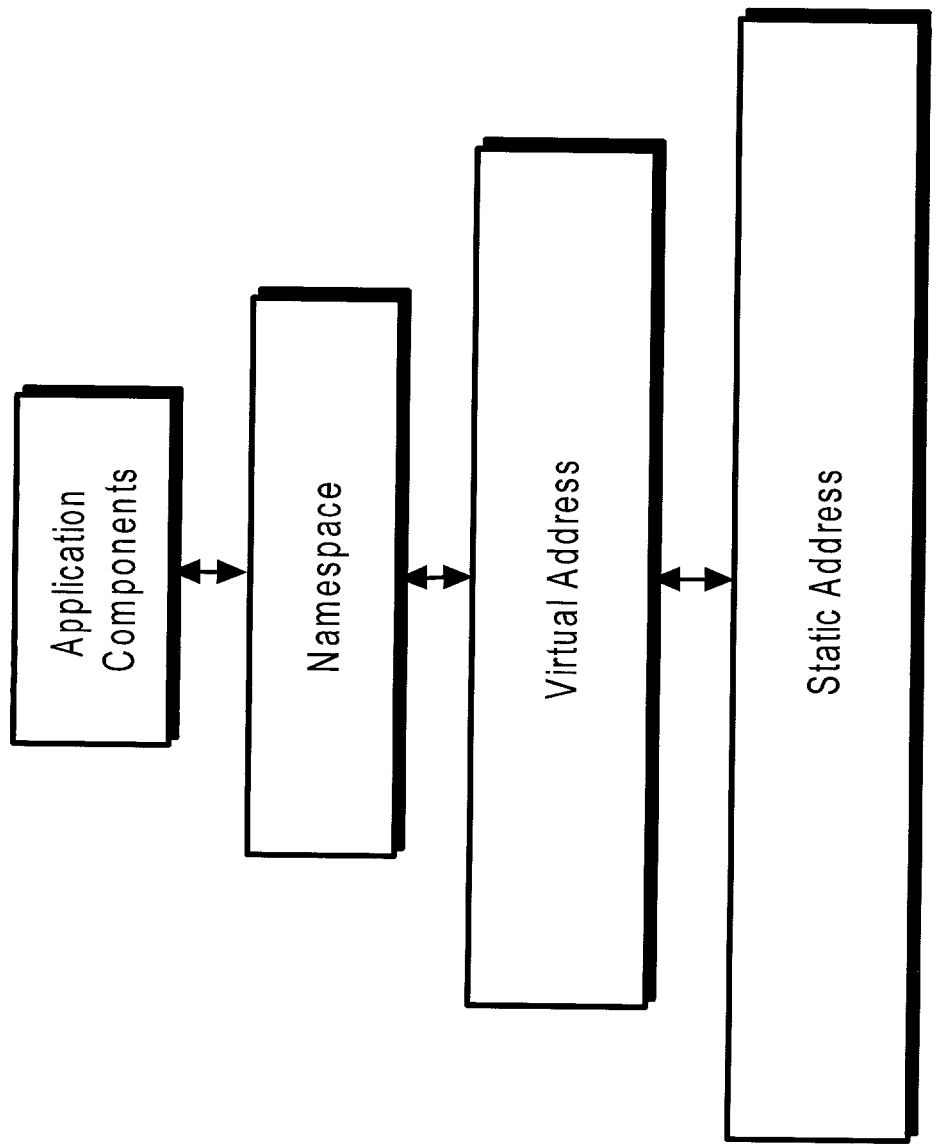
FIG. 9 shows the multiple addressing levels that are used in one embodiment of the present invention.

With reference to FIG. 9, there is shown a hierarchy illustrating the manner in which namespaces and addresses may be used in one embodiment of the present invention. As noted previously, application components (element 202 of FIG. 2) communicate with each other by way of namespaces. For example, when an application component 202 publishes an event, it does so to a namespace. The application component 202 need not specify any particular network address. The application component 202 sends the communication (which includes the namespace specification) to its corresponding communication coordinator 204. In turn, the communication coordinator 204 translates that namespace into an IP addresses. This IP address indicates to which module that communication should be forwarded. In one embodiment, this IP address is one of the virtual IP addresses discussed above. The virtual IP address is then passed down to a corresponding network manager (elements 820, 822, 824 of FIG. 8). In turn, the network manager 820, 822, 824 maps the virtual IP address to a static MAC address, and the network switches 808 use this static MAC address to forward the communication to the appropriate module. In this manner, namespaces are converted to virtual IP addresses, which are in turn converted to static MAC addresses, which are used to actually forward communications to the appropriate modules. By implementing a multi-layer addressing scheme in this way, application components 202 are shielded from the complexities of the underlying network, and the communication coordinators 204 are shielded from the underlying redundancy. Thus, redundancy is implemented without adding complexity to other parts of the switch 100.

Operation

Initialization

The functional components have been disclosed. The interoperation of these components to achieve high availability will now be described. To prepare the switch for normal operation, each module in one embodiment carries out an initialization process. In one embodiment, initialization is performed at the time that a module is introduced to the switch 100, which may be at startup time or during normal operation (e.g. a module is plugged into the switch 100 after the switch 100 is up and running). During initialization, a module broadcasts to all of the other modules in the switch 100 one or more IP address/MAC address mappings that can be used to send communications to it. This broadcast allows all of the network managers 820, 822, 824 to update their corresponding local address tables 830, 832, 834 to include the mappings, so that the mappings can be used at a later time to send communications to the initializing module. To illustrate how the initialization process is carried out, reference will be made to an example.

Suppose that line module 806(1) is the initializing module. As part of the initialization process, the network manager 824(1) of line module 806(1) selects one of the interfaces 850(1)(1), 850(1)(2) to use to effect network communication. Once an interface is selected, the MAC address associated with that interface is determined. Thereafter, the network manager 824(1) associates that MAC address with the module-based virtual IP address LM1 assigned to line module 806(1), and broadcasts both addresses to the network managers 820, 822, 824 of all of the other modules. By doing so, the line module 806(1) is announcing to the rest of the switch 100 that this IP address/MAC address mapping can be used to communicate with it in the future. Upon receiving this broadcast, each network manager 820, 822, 824 updates its corresponding local address table 830, 832, 834 to including the mapping information. Once that is done, all of the modules will have the mapping information needed to send communications to the line module 806(1) in the future.

The initialization process described above is carried out by all of the timing and line modules 804, 806 in the switch 100. An almost identical process is implemented by the control modules 802. The only difference is that, because the control modules 802 do not comprise multiple interfaces, there is no interface selection process. Instead, the module-based virtual IP address of the control module 802 is simply associated with the MAC address of the Ethernet interface 860 on that control module, and that address pair is broadcasted to all of the other modules. In the manner described, each module announces to all of the other modules in the switch 100 an IP address/MAC address mapping that can be used to communicate with it. Once all modules have been initialized, all modules will have the mapping information needed to communicate with all other modules.

The initialization process described above takes care of initializing the module-based virtual IP addresses. The role-based virtual IP addresses still remain to be initialized. Before these virtual IP addresses are initialized, though, the roles are first determined. As noted previously, to determine the roles, the network managers 820 of the control modules 802 carry out a role arbitration process. Likewise, the network managers 822 of the timing modules 804 carry out a role arbitration process. Once the roles are determined, the role-based virtual IP addresses are initialized as follows.

Suppose that through the role arbitration process the control module 802(1) is determined to be the primary control module and the control module 802(2) is the secondary control module. In such a case, each control module initializes itself as follows. The control module 802(1) announces itself as the primary control module by having its network manager 820(1): (1) determine the MAC address of the Ethernet interface 860(1); (2) associate this MAC address with the role-based virtual IP address CMP that is reserved for the primary control module; and (3) broadcast this IP address/MAC address pair to all of the other modules in the switch 100. Similarly, the control module 802(2) announces itself as the secondary control module by having its network manager 820(2): (1) determine the MAC address of the Ethernet interface 860(2); (2) associate this MAC address with the role-based virtual IP address CMS that is reserved for the secondary control module; and (3) broadcast this IP address/MAC address pair to all of the other modules in the switch 100. Upon receiving these broadcasts, each of the network managers 820, 822, 824 of the other modules updates its corresponding local address table 830, 832, 834 to including the mapping information. The role-based virtual IP addresses for the control modules are thus initialized.

The role-based virtual IP addresses for the timing modules 804 may be initialized in a similar manner. Suppose that through the role arbitration process the timing module 804(1) is determined to be the primary timing module and the timing module 804(2) is the secondary timing module. In such a case, each timing module initializes itself as follows. The timing module 804(1) announces itself as the primary timing module by having its network manager 822(1): (1) select one of the interfaces 840(1)(1), 840(1)(2) to use for effecting network communication (note: this selected interface should be the same as that selected during the module-based virtual IP address initialization process); (2) determine the MAC address of the selected interface; (3) associate this MAC address with the role-based virtual IP address TMP that is reserved for the primary timing module; and (4) broadcast this IP address/MAC address pair to all of the other modules in the switch 100. Likewise, the timing module 804(2) announces itself as the secondary timing module by having its network manager 822(2): (1) select one of the interfaces 840(2)(1), 840(2)(2) to use for effecting network communication (note: this selected interface should be the same as that selected during the module-based virtual IP address initialization process); (2) determine the MAC address of the selected interface; (3) associate this MAC address with the role-based virtual IP address TMS that is reserved for the secondary timing module; and (4) broadcast this IP address/MAC address pair to all of the other modules in the switch 100. Upon receiving these broadcasts, each of the network managers 820, 822, 824 of the other modules updates its corresponding local address table 830, 832, 834 to including the mapping information. The role-based virtual IP addresses for the timing modules are thus initialized.

A role-based virtual IP address may also be initialized for each line module 806. However, since the line modules 806 do not play multiple roles, no role arbitration process is implemented. In one embodiment, a line module (e.g. line module 806(1)) initializes its role-based virtual IP address by having its network manager 824(1) do the following: (1) select one of the interfaces 850(1)(1), 850(1)(2) to use for effecting network communication (note: this selected interface should be the same as that selected during the module-based virtual IP address initialization process); (2) determine the MAC address of the selected interface; (3) associate this MAC address with the role-based virtual IP address LM1P that is reserved for line module 1 806(1); and (4) broadcast this IP address/MAC address pair to all of the other modules in the switch 100. Upon receiving this broadcast, each of the network managers 820, 822, 824 of the other modules updates its corresponding local address table 830, 832, 834 to including the mapping information. The role-based virtual IP address is thus initialized for line module 806(1). In one embodiment, each line module 806 initializes a role-based virtual IP address in this manner. After all of the virtual IP addresses have been initialized, the switch 100 is ready for normal operation.

Normal Operation

To illustrate operation of the switch 100, reference will be made to an example. In the following example, it will be assumed that: (1) control module 802(1) is acting as the primary control module; (2) timing module 804(1) is acting as the primary timing module; and (3) each timing module and line module has selected the first interface 840(1)(1), 840(2)(1), 850(1)(1), 850(n)(1) on the module to effect network communication. Suppose now that the communication coordinator 204(1) (FIG. 2) on line module 806(1) wishes to send a message packet to line module 806(n). In this message packet, the communication coordinator 204(1) specifies the module-based virtual IP address LMn of line module 806(n). This message packet is passed from the communication coordinator 204(1) on line module 806(1) to the network manager 824(1) on line module 806(1).

Upon receiving the message packet, the network manager 824(1) extracts the module-based virtual IP address LMn from the message packet. Using the extracted IP address, the network manager 824(1) consults the local address table 834(1) to find the MAC address associated with this IP address. This IP address/MAC address pair should have been broadcasted by the line module 806(n) when it initialized itself with the switch 100. After mapping the IP address LMn to its associated MAC address, the network manager 824(1) addresses the message packet with the MAC address, and forwards the message packet, via interface 850(1)(1), to Ethernet switch 808(1).

Upon receiving the message packet, the Ethernet switch 808(1) uses the MAC address in the packet to consult its local port table 870(1). In one embodiment, port table 870(1) contains information that maps MAC addresses to switch port numbers (note: these port numbers are different from the port numbers used by the CFM). This information enables the Ethernet switch 808(1) to switch information packets to the proper ports/interfaces. Based upon the information in table 870(1), the Ethernet switch 808(1) determines a switch port that is associated with the MAC address, and switches the information packet to that switch port. Assuming no error occurs, that switch port will transport the message packet to the interface 850(n)(1) on the destination line module 806(n). The message packet is thus delivered to the proper destination. This discussion shows how a message packet may be delivered using a module-based virtual IP address.

A similar process may be used to deliver a message using a role-based virtual IP address. Suppose that the communication coordinator 204(1) on line module 806(1) wishes to send a message packet to whichever module is currently acting as the primary timing module. In this message packet, the communication coordinator 204(1) specifies 110 the role-based virtual IP address TMP reserved for the primary timing module. This message packet is passed from the communication coordinator 204(1) on line module 806(1) to the network manager 824(1) on line module 806(1).

In response, the network manager 824(1) extracts the virtual IP address TMP from the message packet. Using the extracted IP address, the network manager 824(1) consults the local address table 834(1) to find the MAC address associated with this IP address. This IP address/MAC address pair should have been broadcasted by the timing module 804(1) at the time it initialized itself as the primary timing module. After mapping the IP address TMP to its associated MAC address, the network manager 824(1) addresses the message packet with the MAC address, and forwards the message packet, via interface 850(1)(1), to Ethernet switch 808(1).

Upon receiving the message packet, the Ethernet switch 808(1) uses the MAC address in the packet to consult its local port table 870(1). Based upon the information in table 870(1), the Ethernet switch 808(1) determines a switch port that is associated with the MAC address, and switches the information packet to that switch port. Assuming no error occurs, that switch port will transport the message packet to the interface 840(1)(1) on the timing module 804(1). The message packet is thus delivered to the proper destination. In this manner, a message packet is delivered using a role-based virtual IP address.

Error/Failure Handling

The above discussion describes how the switch 100 operates when no errors or failures occur. In a high availability system, a primary goal is to maintain normal operation even when an error or failure does occur. With reference to several examples, the error/failure handling capability of the switch 100 will now be described.

Interface Failure

To illustrate how an interface failure is handled within switch 100, suppose that the interface 840(1)(1) that is currently being used by timing module 804(1) to effect network communication fails. In one embodiment, each network manager 820, 822, 824 on each module monitors the status of the interfaces on that module. Thus, when interface 840(1)(1) fails, the network manager 822(1) will detect the failure. In response to the failure, the network manager 822(1) switches over to interface 840(1)(2). To effect this switchover, the network manager 822(1) performs a number of tasks. Initially, it determines the MAC address associated with the interface 840(1)(2). It then associates this MAC address with the module-based virtual IP address TM1 that is assigned to the timing module 804(1). The network manager 822(1) then broadcasts this IP address/ MAC address pair to all of the other modules in the switch 100 to inform the other modules of the interface switchover. In response to this broadcast, each network manager 820, 822, 824 on each module updates its local address table 830, 832, 834 to incorporate the new mapping. From that point on, communications directed to the module-based virtual IP address TM1 will be switched to interface 840(1)(2) rather than interface 840(1)(1). The module-based virtual IP address is thus updated in the switch 100 to reflect the interface switchover.

To update the role-based virtual IP address, the network manager 822(1) carries out a similar process. Initially, the network manager 822(1) determines the role that the timing module 804(1) is currently playing in the switch. In the current example, timing module 804(1) is the primary timing module; thus, its role-based virtual IP address is TMP. That being the case, the network manager 822(1) associates the MAC address of the interface 840(1)(2) with the role-based virtual IP address TMP, and broadcasts this IP address/ MAC address pair to all of the other modules in the switch 100. In response to this broadcast, each network manager 820, 822, 824 on each module updates its local address table 830, 832, 834 to incorporate the new mapping. After that, all communications directed to the role-based virtual IP address TMP will be switched to interface 840(1)(2) rather than interface 840(1)(1). The role-based virtual IP address is thus updated to reflect the interface switchover. After both the module-based and the role-based virtual IP addresses have been updated, switchover to the interface 840(1)(2) is complete.

Notice that after the switchover, the timing module 804(1) will be communicating with the network through its second interface 840(1)(2) and, hence, through Ethernet switch 808(2), while all of the other modules will be communicating with the network through their first interfaces, and hence, through Ethernet switch 808(1). This does not pose a problem. Because there is a connection between the Ethernet switches 808(1), 808(1), communications sent to one Ethernet switch can be conveyed to the other Ethernet switch. For example, a message sent from the timing module 804(1) to the line module 806(1) may take the following route: (1) from interface 840(1)(2) to Ethernet switch 808(2); (2) from Ethernet switch 808(2) to Ethernet switch 808(1) via the direct connection between the Ethernet switches; and (3) from Ethernet switch 808(1) to interface 850(1)(1) of line module 806(1). Thus, even after interface switchover, the timing module 804(1) is still able to communicate with all of the other modules, and vice versa. As a result, normal operation is maintained.

Ethernet Switch Failure

In one embodiment, each of the network managers 820, 822, 824 on each of the modules monitors the status of each of the Ethernet switches 808. If an Ethernet switch 808 fails, and if the failed Ethernet switch 808 is currently being used by the module on which the network manager 820, 822, 824 resides, then the network manager 820, 822, 824 will implement an interface switchover. To illustrate how an Ethernet switch failure is handled, reference will be made to an example. In the following example, it will be assumed that all of the modules (except for timing module 840(1)(2)) are currently using the first interface on the module and hence, the first Ethernet switch 808(1) to effect network communication. It will be further assumed that Ethernet switch 808(1) experiences a failure. In such a case, each of the network managers 820, 822, 824 on each of the modules using Ethernet switch 808(1) will implement an interface switchover. To illustrate how this switchover is implemented, timing module 804(2) will be used as an example. The other modules may implement the switchover in a similar manner.

Upon detecting failure of Ethernet switch 808(1), the network manager 822(2) on timing module 804(2) initially determines whether the timing module 804(2) is currently using Ethernet switch 808(1) to effect network communication. In this example, timing module 804(2) is using interface 840(2)(1) to effect network communication, which means that it is also using Ethernet switch 808(1). That being the case, the network manager 822(2) will implement an interface switchover.

To do so, the network manager 822(2) performs a number of tasks. Initially, it determines the MAC address associated with the interface 840(2)(2). It then associates this MAC address with the module-based virtual IP address TM2 that is assigned to the timing module 804(2). The network manager 822(2) then broadcasts this IP address/MAC address pair (via interface 840(2)(2)) to all of the other modules in the switch 100. Because interface 840(2)(2) is used to send this message, this message broadcast will be carried out by the functioning Ethernet switch 808(2). Thus, the message will be received by each of the other modules. In response to this broadcast, each network manager 820, 822, 824 on each module updates its local address table 830, 832, 834 to incorporate the new mapping. From that point on, communications directed to the module-based virtual IP address TM2 will be switched to interface 840(2)(2) by Ethernet switch 808(2). The module-based virtual IP address is thus updated in the switch 100 to reflect the interface switchover.

To update the role-based virtual IP address, the network manager 822(2) carries out a similar process. Initially, the network manager 822(2) determines the role that the timing module 804(2) is currently playing in the switch. In the current example, timing module 804(1) is the secondary timing module; thus, its role-based virtual IP address is TMS. That being the case, the network manager 822(2) associates the MAC address of the interface 840(2)(2) with the role-based virtual IP address TMS, and broadcasts this IP address/MAC address pair to all of the other modules via interface 840(2)(2). In response to this broadcast, each network manager 820, 822, 824 on each module updates its local address table 830, 832, 834 to incorporate the new mapping. After that, all communications directed to the role-based virtual IP address TMS will be switched to interface 840(2)(2) by Ethernet switch 808(2). The role-based virtual IP address is thus updated to reflect the interface switchover. After both the module-based and the role-based virtual IP addresses have been updated, switchover to the interface 840(2)(2) is complete. In this manner, timing module 804(2) (and all of the other modules that are currently using Ethernet switch 808(1)) changes from using the failed Ethernet switch 808(1) to using the functioning Ethernet switch 808(2). By doing so, the modules maintain normal operation even in the face of an Ethernet switch failure.

Role Change

Another failure that may occur in switch 100 is the failure of a primary module. For example, the primary control module may fail or the primary timing module may fail. In one embodiment, the network manager 820, 822 of each secondary module monitors the status of its corresponding primary module, so that when the primary module fails, the secondary module takes over the functions of the primary module. To take over the functions of the primary module, the network manager 820, 822 of the secondary module implements a role change. To illustrate the role change process, reference will be made to an example. The following example illustrates a role change as performed by the secondary timing module 804(2). It should be noted, though, that the secondary control module 802(2) may implement a role change in a similar manner.

Suppose that the network manager 822(2) on the secondary timing module 804(2) detects a failure of the primary timing module 804(1). Upon detecting such failure, the secondary timing module 804(2) assumes the role of the primary timing module. To announce this role change to the other modules in the switch 100, the network manager 822(2): (1) determines which of the interfaces 840(2)(1), 840(2)(2) is currently being used to effect network communication; (2) determines the MAC address of that interface; (3) associates this MAC address with the role-based virtual IP address TMP that is reserved for the primary timing module; and (4) broadcasts this IP address/MAC address pair to all of the other modules in the switch 100. Upon receiving this broadcast, each of the network managers 820, 822, 824 of the other modules will update its corresponding local address table 830, 832, 834 to including the mapping information. From that point on, all communications directed to the primary timing module using the role-based virtual IP address TMP will be switched to timing module 804(2) rather than 804(1). The role change is thus completed. By implementing a role change in this manner, the switch 100 is able to seamlessly maintain normal operation even in the face of a primary module failure.

At this point, it should be noted that although the invention has been described with reference to one or more specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A communication mechanism, comprising:
    a first network interface, said first network interface having a first static address which is initially mapped to a mechanism-based virtual address associated with said communication mechanism;
    a second network interface, said second network interface having a second static address; and
    a management mechanism coupled to said first and second network interfaces for effecting network communication therewith,
    said management mechanism monitoring said first network interface for an indication of malfunction,
    said management mechanism, upon detecting the malfunction, dynamically mapping the mechanism-based virtual address to create an updated mapping by associating said mechanism-based virtual address with said second static address rather than said first static address,
    said management mechanism sending said updated mapping via said second network interface to a plurality of other mechanisms in a network,
    said other mechanisms using said updated mapping to communicate with said communication mechanism such that said other mechanisms send communications having said mechanism-based virtual address associated therewith to said communication mechanism via said second network interface rather than said first network interface.

2. The communication mechanism of claim 1, wherein said first network interface is coupled to said network via a first network connection, and said second network interface is coupled to said network via a second network connection, wherein said first and second network connections are separate and distinct.

3. The communication mechanism of claim 1, wherein said first network interface is coupled to a first network switch and said second network interface is coupled to a second network switch.

4. The communication mechanism of claim 3, wherein said first network switch is coupled to said second network switch.

5. The communication mechanism of claim 1, wherein said mechanism-based virtual address is a higher level address than said first and second static addresses.

6. The communication mechanism of claim 5, wherein said mechanism-based virtual address comprises an Internet Protocol (IP) address, said first static address comprises a first media access control (MAC) address, and said second static address comprises a second MAC address.

7. The communication mechanism of claim 5, wherein said mechanism-based virtual address is used by higher level components to send one or more communications to said communication mechanism.

8. The communication mechanism of claim 7, wherein said first network interface is coupled to a first network switch and said second network interface is coupled to a second network switch, and wherein said first and second static addresses are used by said first and second network switches to switch one or more communications to said communication mechanism via said first and second network interfaces.

9. The communication mechanism of claim 1, wherein said communication mechanism is operating in a particular role, said particular role having a role-based virtual address associated therewith, and wherein said management mechanism, upon detecting malfunction of said first network interface, derives a second updated mapping by associating said role-based virtual address with said second static address, said management mechanism sending said second updated mapping via said second network interface to said plurality of other mechanisms to cause said other mechanisms to use said second updated mapping in sending future communications to said role-based virtual address, said second updated mapping causing said other mechanisms to send future communications addressed to said role-based virtual address to said communication mechanism via said second network interface rather than said first network interface.

10. A communication mechanism, comprising:
    a first network interface coupled to a first network switch, said first network interface having a first static address which is initially mapped to a mechanism-based virtual address associated with said communication mechanism;
    a second network interface coupled to a second network switch, said second network interface having a second static address; and a management mechanism coupled to said first and second network interfaces for effecting network communication therewith, said management mechanism monitoring for an indication of malfunction of said first network switch, said management mechanism, upon detecting the malfunction, dynamically mapping the mechanism based virtual address to create an updated mapping by associating said mechanism-based virtual address with said second static address rather than said first static address, said management mechanism sending said updated mapping via said second network interface and said second network switch to a plurality of other mechanisms in a network said other mechanisms using said updated mapping to communicate with said communication mechanism such that said other mechanisms send communications having said mechanism-based virtual address associated therewith to said communication mechanism via said second network interface rather than said first network interface.

11. The communication mechanism of claim 10, wherein said first network switch is coupled to said second network switch.

12. The communication mechanism of claim 10, wherein said mechanism-based virtual address is a higher level address than said first and second static addresses.

13. The communication mechanism of claim 12, wherein said mechanism-based virtual address comprises an Internet Protocol (IP) address, said first static address comprises a first media access control (MAC) address, and said second static address comprises a second MAC address.

14. The communication mechanism of claim 12, wherein said mechanism-based virtual address is used by higher level components to send one or more communications to said communication mechanism.

15. The communication mechanism of claim 14, wherein said first and second static addresses are used by said first and second network switches to switch one or more communications to said communication mechanism via said first and second network interfaces.

16. The communication mechanism of claim 10, wherein said communication mechanism is operating in a particular role, said particular role having a role-based virtual address associated therewith, and wherein said management mechanism, upon detecting malfunction of said first network switch, derives a second updated mapping by associating said role-based virtual address with said second static address, said management mechanism sending said second updated mapping via said second network interface and said second network switch to said plurality of other mechanisms to cause said other mechanisms to use said second updated mapping in sending future communications to said role-based virtual address, said second updated mapping causing said other mechanisms to send future communications addressed to said role-based virtual address to said communication mechanism via said second network interface rather than said first network interface.

17. A communication mechanism, comprising:

a first network interface having a first static address; and a management mechanism coupled to said first network interface for effecting network communication therewith, said management mechanism monitoring a peer mechanism for an indication of malfunction, said peer mechanism operating in a particular role, said particular role have a role-based virtual address associated therewith, said management mechanism, upon detecting malfunction of said peer mechanism, dynamically mapping the role-based virtual address to create an updated mapping by associating said role-based virtual address with said first static address, said management mechanism sending said updated mapping via said first network interface to a plurality of other mechanisms in a network said other mechanisms using said updated mapping to send communications to said role-based virtual address, such that said other mechanisms send communications addressed to said role-based virtual address to said communication mechanism, via said first network interface, rather than said peer mechanism.

18. The communication mechanism of claim 17, wherein said role-based virtual address is a higher level address than said first static address.

19. The communication mechanism of claim 18, wherein said role-based virtual address comprises an Internet Protocol (IP) address, and said first static address comprises a media access control (MAC) address.

20. The communication mechanism of claim 18, wherein said role-based virtual address is used by higher level components to send one or more communications to whichever mechanism is operating in said particular role.

21. The communication mechanism of claim 20, wherein said first network interface is coupled to a network switch, and wherein said first static address is used by said network switch to switch one or more communications to said communication mechanism via said first network interface.

22. The communication mechanism of claim 17, wherein said communication mechanism further comprises a second network interface coupled to said management mechanism having a second static address, and wherein said management mechanism monitors said first network interface for an indication of malfunction, and upon detecting malfunction, said management mechanism deriving a second updated mapping by associating said role-based virtual address with said second static address rather than said first static address, said management mechanism sending said second updated mapping via said second network interface to said other mechanisms to cause said other mechanisms to use said second updated mapping in sending future communications to said role-based virtual address, said updated mapping causing said other mechanisms to send future communications addressed to said role-based virtual address to said communication mechanism via said second network interface rather than said first network interface.

23. The communication mechanism of claim 17, wherein said communication mechanism further comprises a second network interface coupled to said management mechanism having a second static address, wherein said first network interface is coupled to a first network switch, wherein said second network interface is coupled to a second network switch, and wherein said management mechanism monitors for an indication of malfunction of said first network interface, and upon detecting malfunction of said first network switch, said management mechanism deriving a second updated mapping by associating said role-based virtual address with said second static address rather than said first static address, said management mechanism sending said second updated mapping via said second network interface to said other mechanisms to cause said other mechanisms to use said second updated mapping in sending future communications to said role-based virtual address, said updated mapping causing said other mechanisms to send future communications addressed to said role-based virtual address to said communication mechanism via said second network interface rather than said first network interface.

24. In a communication mechanism comprising a first network interface having a first static address, and a second network interface having a second static address, said first static address being initially mapped to a mechanism-based virtual address associated with said communication mechanism, a computer readable medium comprising instructions which, when executed by one or more processors, cause the one or more processors to manage communication, said computer readable medium comprising:
  instructions for causing one or more processors to monitor said first network interface for an indication of malfunction;
  instructions for causing one or more processors to, upon detecting malfunction, dynamically map the mechanism-based virtual address to create an updated mapping by associating said mechanism-based virtual address with said second static address rather than said first static address;
  instructions for causing one or more processors to send said updated mapping via said second network interface to a plurality of other mechanisms in a network;
  instructions for causing said other mechanisms to use said updated mapping to communicate with said communication mechanism; and
  instructions for causing other mechanisms to send communications having said mechanism-based virtual address associated therewith to said communication mechanism via said second network interface rather than said first network interface.

25. The computer readable medium of claim 24, wherein said mechanism-based virtual address is a higher level address than said first and second static addresses.

26. The computer readable medium of claim 25, wherein said mechanism-based virtual address comprises an Internet Protocol (IP) address, said first static address comprises a first media access control (MAC) address, and said second static address comprises a second MAC address.

27. The computer readable medium of claim 25, wherein said mechanism-based virtual address is used by higher level components to send one or more communications to said communication mechanism.

28. The computer readable medium of claim 27, wherein said first network interface is coupled to a first network switch and said second network interface is coupled to a second network switch, and wherein said first and second static addresses are used by said first and second network switches to switch one or more communications to said communication mechanism via said first and second network interfaces.

29. The computer readable medium of claim 24, wherein said communication mechanism is operating in a particular role, said particular role having a role-based virtual address associated therewith, and wherein said computer readable medium further comprises:
  instructions for causing one or more processors to, upon detecting malfunction of said first network interface, derive a second updated mapping by associating said role-based virtual address with said second static address; and
  instructions for causing one or more processors to send said second updated mapping via said second network interface to said plurality of other mechanisms to cause said other mechanisms to use said second updated mapping in sending future communications to said role-based virtual address, said second updated mapping causing said other mechanisms to send future communications addressed to said role-based virtual address to said communication mechanism via said second network interface rather than said first network interface.

30. In a communication mechanism comprising a first network interface having a first static address, and a second network interface having a second static address, said first network interface coupled to a first network switch and said second network interface coupled to a second network switch, said first static address being initially mapped to a mechanism-based virtual address associated with said communication mechanism, a computer readable medium comprising instructions which, when executed by one or more processors, cause the one or more processors to manage communication, said computer readable medium comprising:
  instructions for causing one or more processors to monitor for an indication of malfunction of said first network switch;
  instructions for causing one or more processors to, upon detecting malfunction of said first network switch, dynamically map the mechanism-based virtual address to create an updated mapping by associating said mechanism-based virtual address with said second static address rather than said first static address;
  instructions for causing one or more processors to send said updated mapping via said second network interface and said second network switch to a plurality of other mechanisms in a network;
  instructions for causing said other mechanisms to use said updated mapping to communicate with said communication mechanism; and
  instructions for causing said other mechanisms to send communications having said mechanism-based virtual address associated therewith to said communication mechanism via said second network interface rather than said first network interface.

31. The computer readable medium of claim 30, wherein said mechanism-based virtual address is a higher level address than said first and second static addresses.

32. The computer readable medium of claim 31, wherein said mechanism-based virtual address comprises an Internet Protocol (IP) address, said first static address comprises a first media access control (MAC) address, and said second static address comprises a second MAC address.

33. The computer readable medium of claim 31, wherein said mechanism-based virtual address is used by higher level components to send one or more communications to said communication mechanism.

34. The computer readable medium of claim 33, wherein said first and second static addresses are used by said first and second network switches to switch one or more communications to said communication mechanism via said first and second network interfaces.

35. The computer readable medium of claim 31, wherein said communication mechanism is operating in a particular role, said particular role having a role-based virtual address associated therewith, and wherein said computer readable medium further comprises:
  instructions for causing one or more processors to, upon detecting malfunction of said first network switch, derive a second updated mapping by associating said role-based virtual address with said second static address; and instructions for causing one or more processors to send said second updated mapping via said second network interface and said second network switch to said plurality of other mechanisms to cause said other mechanisms to use said second updated mapping in sending future communications to said role-based virtual address, said second updated mapping causing said other mechanisms to send future communications addressed to said role-based virtual address to said communication mechanism via said second network interface rather than said first network interface.

36. In a communication mechanism comprising a first network interface having a first static address, a computer readable medium comprising instructions which, when executed by one or more processors, cause the one or more processors to manage communication, said computer readable medium comprising:

instructions for causing one or more processors to monitor a peer mechanism for an indication of malfunction, said peer mechanism operating in a particular role, said particular role have a role-based virtual address associated therewith;

instructions for causing one or more processors to, upon detecting malfunction of said peer mechanism, dynamically map the role-based virtual address to create an updated mapping by associating said role-based virtual address with said first static address;

instructions for causing one or more processors to send said updated mapping via said first network interface to a plurality of other mechanisms in a network; and instructions for causing said other mechanisms to use said updated mapping in sending communications to said role-based virtual address, such that said other mechanisms send communications addressed to said role-based virtual address to said communication mechanism, via said first network interface, rather than said peer mechanism.

37. The computer readable medium of claim 36, wherein said role-based virtual address is a higher level address than said first static address.

38. The computer readable medium of claim 37, wherein said role-based virtual address comprises an Internet Protocol (IP) address, and said first static address comprises a media access control (MAC) address.

39. The computer readable medium of claim 37, wherein said role-based virtual address is used by higher level components to send one or more communications to whichever mechanism is operating in said particular role.

40. The computer readable medium of claim 39, wherein said first network interface is coupled to a network switch, and wherein said first static address is used by said network switch to switch one or more communications to said communication mechanism via said first network interface.

41. The computer readable medium of claim 36, wherein said communication mechanism further comprises a second network interface having a second static address, and wherein said computer readable medium further comprises:

instructions for causing one or more processors to monitor said first network interface for an indication of malfunction;

instructions for causing one or more processors to, upon detecting malfunction, derive a second updated mapping by associating said role-based virtual address with said second static address rather than said first static address; and instructions for causing one or more processors to send said second updated mapping via said second network interface to said other mechanisms to cause said other mechanisms to use said second updated mapping in sending future communications to said role-based virtual address, said updated mapping causing said other mechanisms to send future communications addressed to said role-based virtual address to said communication mechanism via said second network interface rather than said first network interface.

42. The computer readable medium of claim 36, wherein said communication mechanism further comprises a second network interface having a second static address, wherein said first network interface is coupled to a first network switch, wherein said second network interface is coupled to a second network switch, and wherein said computer readable medium further comprises:

instructions for causing one or more processors to monitor for an indication of malfunction of said first network interface;

instructions for causing one or more processors to, upon detecting malfunction of said first network switch, derive a second updated mapping by associating said role-based virtual address with said second static address rather than said first static address; and instructions for causing one or more processors to send said second updated mapping via said second network interface to said other mechanisms to cause said other mechanisms to use said second updated mapping in sending future communications to said role-based virtual address, said updated mapping causing said other mechanisms to send future communications addressed to said role-based virtual address to said communication mechanism via said second network interface rather than said first network interface.

43. A communication system, comprising:

a first network switch;

a second network switch;

a first communication mechanism comprising:
  a first network interface coupled to said first network switch;
  a second network interface coupled to said second network switch; and
  a first communication manager for managing network communication via said first and second network interfaces; and a second communication mechanism comprising:
  a third network interface coupled to said first network switch;
  a fourth network interface coupled to said second network switch; and
  a second communication manager for managing network communication via said third and fourth network interfaces, wherein said first network interface has a first static address and said second network interface has a second static address, wherein said first communication mechanism has a first mechanism-based virtual address associated therewith, and wherein said first management mechanism dynamically maps said first mechanism-based virtual address to either said first static address or said second static address, wherein said first management mechanism initially maps said first mechanism-based virtual address to said first static address, and said first management mechanism monitoring said first network interface for an indication of malfunction, said first management mechanism, upon detecting malfunction, dynamically mapping the first mechanism-based virtual address to create an updated mapping by associating said first mechanism-based virtual address with said second static address rather than said first static address, said first management mechanism sending said updated mapping via said second network interface to at least said second communication mechanism to inform said second communication mechanism of said updated mapping; and said second communication mechanism using the updated mapping to communicate with the first communication mechanism.

44. The communication system of claim 43, wherein said first network switch is coupled to said second network switch.

45. The communication system of claim 43, wherein said third network interface has a third static address and said fourth network interface has a fourth static address, wherein said second communication mechanism has a second mechanism-based virtual address associated therewith, and wherein said second management mechanism can map said second mechanism-based virtual address to either said third static address or said fourth static address.

46. The communication system of claim 43, wherein said first mechanism-based virtual address is a higher level address than said first and second static addresses.

47. The communication system of claim 46, wherein said first mechanism-based virtual address comprises an Internet Protocol (IP) address, said first static address comprises a first media access control (MAC) address, and said second static address comprises a second MAC address.

48. The communication system of claim 46, wherein said first mechanism-based virtual address is used by higher level components to send one or more communications to said first communication mechanism.

49. The communication system of claim 48, said first and second static addresses are used by said first and second network switches to switch one or more communications to said first communication mechanism via said first and second network interfaces.

50. The communication system of claim 43, wherein said second communication mechanism receives said updated mapping, and wherein said second communication mechanism receives a message addressed to said first mechanism-based virtual address, and responds by using said updated mapping to direct said message to said first communication mechanism via said second network interface rather than said first network interface.

51. The communication system of claim 43, wherein said first communication mechanism is operating in a particular role, said particular role having a role-based virtual address associated therewith, and wherein said first management mechanism, upon detecting malfunction of said first network interface, derives a second updated mapping by associating said role-based virtual address with said second static address, said first management mechanism sending said second updated mapping via said second network interface to at least said second communication mechanism to inform said second communication mechanism of said second updated mapping.

52. The communication system of claim 51, wherein said second communication mechanism receives said second updated mapping, and wherein said second communication mechanism receives a second message addressed to said role-based virtual address, and responds by using said second updated mapping to direct said second message to said first communication mechanism via said second network interface rather than said first network interface.

53. The communication system of claim 43, wherein said first management mechanism initially maps said first mechanism-based virtual address to said first static address, and wherein said first management mechanism monitors for an indication of malfunction of said first network switch, and upon detecting malfunction of said first network switch, said first management mechanism deriving an updated mapping by associating said first mechanism-based virtual address with said second static address rather than said first static address, said first management mechanism sending said updated mapping via said second network interface to at least said second communication mechanism to inform said second communication mechanism of said updated mapping.

54. The communication system of claim 53, wherein said second communication mechanism receives said updated mapping, and wherein said second communication mechanism receives a message addressed to said first mechanism-based virtual address, and responds by using said updated mapping to direct said message to said first communication mechanism via said second network interface rather than said first network interface.

55. The communication system of claim 53, wherein said first communication mechanism is operating in a particular role, said particular role having a role-based virtual address associated therewith, and wherein said first management mechanism, upon detecting malfunction of said first network switch, derives a second updated mapping by associating said role-based virtual address with said second static address, said first management mechanism sending said second updated mapping via said second network interface to at least said second communication mechanism to inform said second communication mechanism of said second updated mapping.

56. The communication system of claim 55, wherein said second communication mechanism receives said second updated mapping, and wherein said second communication mechanism receives a second message addressed to said role-based virtual address, and responds by using said second updated mapping to direct said second message to said first communication mechanism via said second network interface rather than said first network interface.

57. The communication system of claim 43, wherein said communication system further comprises a third communication mechanism comprising a fifth network interface coupled to said first network switch and a sixth network interface coupled to said second network switch, wherein said first management mechanism initially maps said first mechanism-based virtual address to said first static address, and wherein said first management mechanism monitors said second communication mechanism for an indication of malfunction, said second communication mechanism operating in a particular role, said particular role have a role-based virtual address associated therewith, and upon detecting malfunction of said second communication mechanism, said first management mechanism deriving an updated mapping by associating said role-based virtual address with said first static address, said first management mechanism sending said updated mapping via said first network interface to at least said third communication mechanism to inform said third communication mechanism of said updated mapping.

58. The communication system of claim 57, wherein said third communication mechanism receives said updated mapping, and wherein said third communication mechanism receives a message addressed to said role-based virtual address, and responds by using said updated mapping to direct said message to said first communication mechanism, via said first network interface, rather than to said second communication mechanism.

59. The communication system of claim 43, further comprising:
- a third communication mechanism comprising:
  - a fifth network interface coupled to said first network switch, said fifth network interface having a static address; and
  - a third management mechanism for managing network communication via said fifth network interface; and
- a fourth communication mechanism comprising:
  - a sixth network interface coupled to said second network switch; and
  - a fourth management mechanism for managing network communication via said sixth network interface.

60. The communication system of claim 59, wherein said third management mechanism monitors said fourth communication mechanism for an indication of malfunction, said fourth communication mechanism operating in a particular role, said particular role have a role-based virtual address associated therewith, and upon detecting malfunction of said fourth communication mechanism, said third management mechanism deriving an updated mapping by associating said role-based virtual address with said static address, said third management mechanism sending said updated mapping via said fifth network interface to at least said first and second communication mechanisms to inform said first and second communication mechanisms of said updated mapping.

61. The communication system of claim 60, wherein said first communication mechanism receives said updated mapping, and wherein said first communication mechanism receives a message addressed to said role-based virtual address, and responds by using said updated mapping to direct said message to said third communication mechanism, via said fifth network interface, rather than to said fourth communication mechanism.

* * * * *